United States Patent
Arai et al.

(10) Patent No.: US 12,151,605 B2
(45) Date of Patent: Nov. 26, 2024

(54) LIGHT DISTRIBUTION CONTROLLING DEVICE, VEHICLE POSITION DETECTING DEVICE, VEHICLE LAMP SYSTEM, LIGHT DISTRIBUTION CONTROLLING METHOD, AND VEHICLE POSITION DETECTING METHOD

(71) Applicant: KOITO MANUFACTURING CO., LTD., Tokyo (JP)

(72) Inventors: Kensuke Arai, Shizuoka (JP); Takuya Kataoka, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 132 days.

(21) Appl. No.: 17/714,371

(22) Filed: Apr. 6, 2022

(65) Prior Publication Data

US 2022/0227285 A1    Jul. 21, 2022

Related U.S. Application Data

(63) Continuation of application No. PCT/JP2020/037744, filed on Oct. 5, 2020.

(30) Foreign Application Priority Data

Oct. 10, 2019  (JP) .................................. 2019-186556
Oct. 29, 2019  (JP) .................................. 2019-196322

(51) Int. Cl.
*B60Q 1/14*  (2006.01)
*B60Q 1/00*  (2006.01)
(Continued)

(52) U.S. Cl.
CPC ........... *B60Q 1/143* (2013.01); *B60Q 1/0023* (2013.01); *G06V 10/751* (2022.01); *G06V 20/58* (2022.01);
(Continued)

(58) Field of Classification Search
CPC ............... B60Q 2300/42; B60Q 1/143; B60Q 2300/41; B60Q 9/008; B60Q 1/1423
See application file for complete search history.

(56) References Cited

U.S. PATENT DOCUMENTS

2009/0231866 A1*  9/2009  Yamamura ............. B60Q 1/085
                                                                  362/466
2015/0258928 A1*  9/2015  Goto ...................... B60Q 1/525
                                                                   701/49

(Continued)

FOREIGN PATENT DOCUMENTS

CN    103050008 A    4/2013
JP    2014232431 A   12/2014
(Continued)

OTHER PUBLICATIONS

International Search Report (PCT/ISA/210) with translation mailed on Dec. 1, 2020, by the Japan Patent Office as the International Searching Authority for International Application No. PCT/JP2020/037744. (7 pages).

(Continued)

*Primary Examiner* — Wei (Victor) Y Chan
(74) *Attorney, Agent, or Firm* — BUCHANAN, INGERSOLL & ROONEY PC

(57) ABSTRACT

A light distribution controlling device includes a vehicle detector that detects a front vehicle through an image analysis on an image obtained from an imaging device, a region determiner that sets a processing region by adding a margin in a widthwise direction of the vehicle to a presence region of the front vehicle, and a pattern determiner that, in parallel with the detection of the front vehicle, sets a light blocking portion based on a pixel value of a pair of luminous points included in the processing region in the image and determines a light distribution pattern that includes the light blocking portion.

7 Claims, 12 Drawing Sheets

(51) Int. Cl.
*G06V 10/75* (2022.01)
*G06V 20/58* (2022.01)
(52) U.S. Cl.
CPC ...... *B60Q 2300/41* (2013.01); *B60Q 2300/42* (2013.01)

(56) References Cited

U.S. PATENT DOCUMENTS

2016/0332560 A1\* 11/2016 Nakatani ............... F21S 41/153
2018/0257561 A1\* 9/2018 Kapuria ................ B60W 50/14

FOREIGN PATENT DOCUMENTS

| JP | 2015064964 A | 4/2015 |
| JP | 2019156276 A | 9/2019 |

OTHER PUBLICATIONS

International Preliminary Report on Patentability (Form PCT/IB/373) and Written Opinion (PCT/ISA/237) with translation mailed on Apr. 12, 2022, for International Application No. PCT/JP2020/037744. (10 pages).

Office Action issued on Oct. 9, 2024 by European Patent Office in Corresponding EP Application No. 20873670.2 (6 Pages).

\* cited by examiner

LIGHT DISTRIBUTION CONTROLLING DEVICE, VEHICLE POSITION DETECTING DEVICE, VEHICLE LAMP SYSTEM, LIGHT DISTRIBUTION CONTROLLING METHOD, AND VEHICLE POSITION DETECTING METHOD

CROSS-REFERENCE TO RELATED APPLICATIONS

This application is based upon and claims the benefit of priority from the prior Japanese Patent Application No. 2019-186556, filed on Oct. 10, 2019, the prior Japanese Patent Application No. 2019-196322, filed on Oct. 29, 2019, and International Patent Application No. PCT/JP2020/037744, filed on Oct. 5, 2020, the entire content of each of which is incorporated herein by reference.

BACKGROUND

Field of the Invention

The present invention relates to light distribution controlling devices, vehicle lamp systems, and light distribution controlling methods and relates, in particular, to a light distribution controlling device, a vehicle lamp system, and a light distribution controlling method for use in, for example, an automobile. The present invention further relates to vehicle position detecting devices, vehicle lamp systems, and vehicle position detecting methods.

Description of the Related Art

Vehicle lamps play an important role in safe driving at night or inside tunnels. If, with the priority on the visibility of the driver, vehicle lamps brightly illuminate a wide range in the space ahead of the vehicle, this creates a problem of causing glare to the driver of a preceding vehicle or an oncoming vehicle ahead of the host vehicle.

Adaptive driving beam (ADB) control has been proposed in recent years, and this ADB control dynamically and adaptively controls a light distribution pattern of a high beam based on the condition surrounding the vehicle (see, for example, patent document 1). The ADB control, by use of a camera, detects the presence of a target that is located ahead of the host vehicle and that should be shaded against high luminance light. Then, the ADB control reduces or eliminates the light for the region corresponding to this target to be shaded against the light.

Patent document 1: JP2015-064964

The ADB control described above can improve the visibility of the driver of the host vehicle while preventing glare caused to front vehicles, such as a preceding vehicle and an oncoming vehicle. The improved visibility allows the driver to recognize obstacles and so on ahead of the vehicle more reliably, and this in turn improves the safety in driving. Meanwhile, there exists a constant demand for further improving the visibility of drivers for further improvement in safety. In implementing the ADB control, grasping the position of a front vehicle is important.

SUMMARY OF THE INVENTION

The present invention has been made in view of such circumstances, and one object of the present invention is to provide a technique for improving the visibility of a driver. Another object of the present invention is to provide a novel technique for detecting the position of a vehicle.

To address the problem described above, one aspect of the present invention provides a light distribution controlling device. This device includes a vehicle detector, a region determiner, and pattern determiner. The vehicle detector detects a front vehicle through an image analysis on an image obtained from an imaging device that captures an image of a region ahead of a vehicle. The region determiner sets a processing region by adding a predetermined margin in a widthwise direction of the vehicle to a presence region of the front vehicle. The pattern determiner, in parallel with the detection of the front vehicle by the vehicle detector, sets a light blocking portion based on a pixel value of a pair of luminous points included in the processing region and appearing side by side in the widthwise direction of the vehicle in the image obtained from the imaging device and determines a light distribution pattern that includes the light blocking portion.

Another aspect of the present invention provides a vehicle lamp system. This system includes an imaging device, a light distribution variable lamp, the light distribution controlling device according to the above aspect, and a lamp controlling device. The imaging device captures an image of a region ahead of a vehicle. The light distribution variable lamp can illuminate the region ahead of the vehicle with a visible light beam of a variable intensity distribution. The lamp controlling device controls the light distribution variable lamp so as to form the light distribution pattern.

Yet another aspect of the present invention provides a light distribution controlling method. This controlling method includes: detecting a front vehicle through an image analysis on an image obtained from an imaging device that captures an image of a region ahead of a vehicle; setting a processing region by adding a predetermined margin in a widthwise direction of the vehicle to a presence region of the front vehicle; and in parallel with the detecting of the front vehicle, setting a light blocking portion based on a pixel value of a pair of luminous points included in the processing region and appearing side by side in the widthwise direction of the vehicle in the image obtained from the imaging device and determining a light distribution pattern that includes the light blocking portion.

Yet another aspect of the present invention provides a vehicle position detecting device. This device generates a lateral dilated region by performing a first dilation process and a first erosion process on an image that is based on an imaging device by use of a first structuring element of a predetermined shape elongated in a widthwise direction of a vehicle, and detects a position of a front vehicle based on the lateral dilated region. The lateral dilated region is a region in which a pair of luminous points included in the image and appearing side by side in the widthwise direction of the vehicle are connected to each other. The imaging device captures an image of a region ahead of the vehicle.

Yet another aspect of the present invention provides a vehicle lamp system. This system includes an imaging device, a light distribution variable lamp, a light distribution controlling device, and a lamp controlling device. The imaging device captures an image of a region ahead of a vehicle. The light distribution variable lamp can illuminate the region ahead of the vehicle with a visible light beam of a variable intensity distribution. The light distribution controlling device includes the vehicle position detecting device according to the above aspect and a pattern determiner that determines a light distribution pattern including a light blocking portion based on a detection result of the vehicle position detecting device. The lamp controlling device controls the light distribution variable lamp so as to form the light distribution pattern.

Yet another aspect of the present invention provides a vehicle position detecting method. This controlling method includes: generating a lateral dilated region by performing a first dilation process and a first erosion process on an image that is based on an imaging device by use of a first structuring element of a predetermined shape elongated in a widthwise direction of a vehicle, the lateral dilated region being a region in which a pair of luminous points included in the image and appearing side by side in the widthwise direction of the vehicle are connected to each other, the imaging device capturing an image of a region ahead of the vehicle; and detecting a position of a front vehicle based on the lateral dilated region.

Any optional combination of the above constituent elements or an embodiment obtained by converting what is expressed by the present invention between a method, a device, a system, and so on is also valid as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
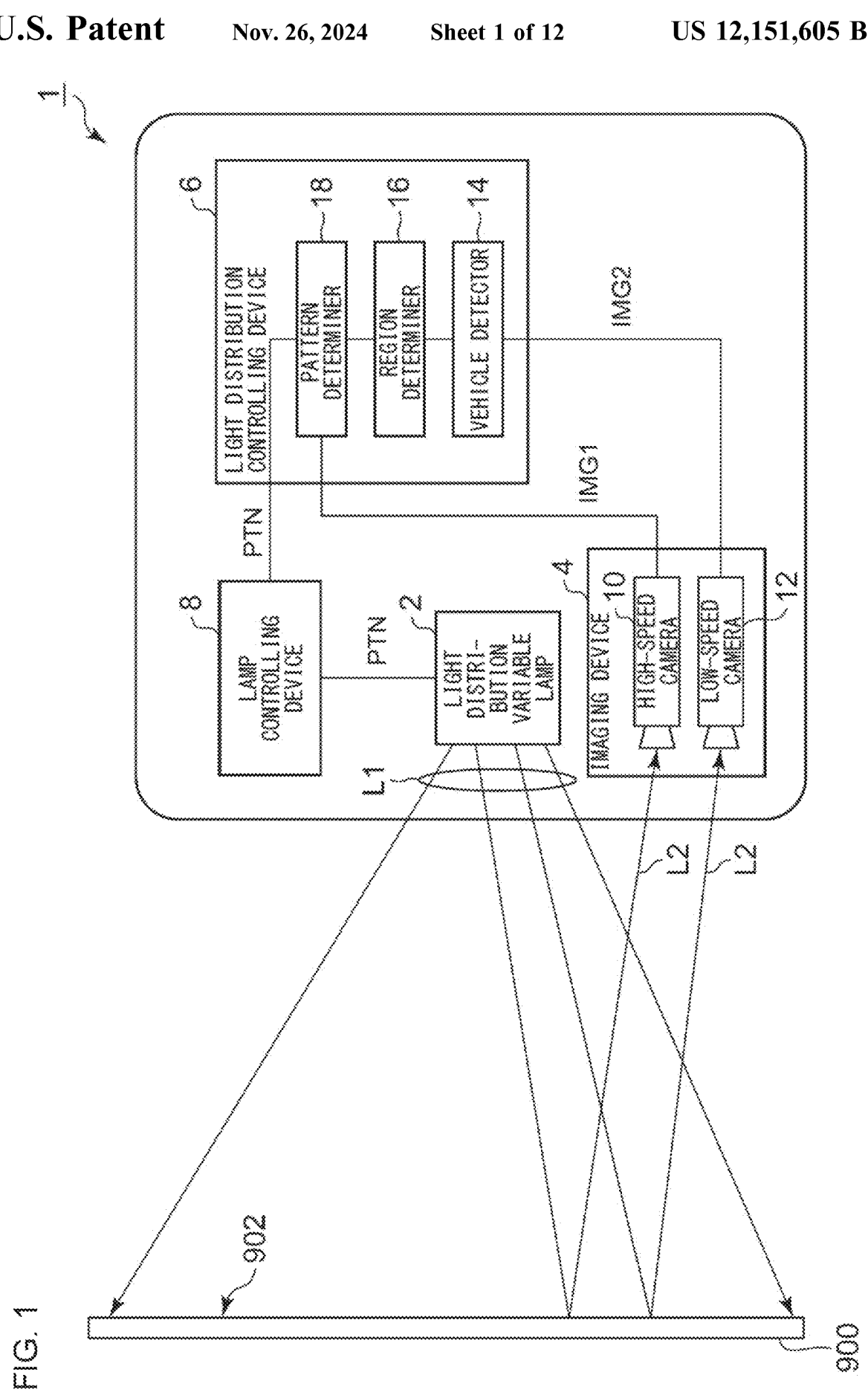
FIG. 1 is a block diagram of a vehicle lamp system according to Embodiment 1.

Hereinafter, the present invention will be described based on some exemplary embodiments and with reference to the drawings. The embodiments are illustrative in nature and are not intended to limit the invention. Not all the features and combinations thereof described according to the embodiments are necessarily essential to the invention. Identical or equivalent constituent elements, members, and processes illustrated in the drawings are given identical reference characters, and duplicate description thereof will be omitted, as appropriate.

The scales and the shapes of the components illustrated in the drawings are set merely for convenience in order to facilitate an understanding of the description and are not to be interpreted as limiting the invention, unless specifically indicated otherwise. When terms such as "first" and "second" are used in the present specification or in the claims, these terms do not indicate the order or the levels of importance in any way and are merely used to distinguish between a given configuration and another configuration, unless specifically indicated otherwise. The part of a member that is not important in describing the embodiments are omitted from the drawings.

Embodiment 1

FIG. 1 is a block diagram of a vehicle lamp system according to Embodiment 1. FIG. 1 depicts some of the constituent elements of a vehicle lamp system 1 in the form of functional blocks. These functional blocks are implemented, in terms of their hardware configuration, by elements and/or circuits, such as a CPU or a memory of a computer, or implemented, in terms of their software configuration, by a computer program or the like. It is to be appreciated by a person skilled in the art that these functional blocks can be implemented in a variety of forms through combinations of hardware and software.

The vehicle lamp system 1 includes a light distribution variable lamp 2, an imaging device 4, a light distribution controlling device 6, and a lamp controlling device 8. These members may be embedded within a single chassis, or some of these members may be provided outside a chassis, that is, provided in the vehicle.

The light distribution variable lamp 2 is a white light source that can illuminate a region ahead of the vehicle with a visible light beam L1 of a variable intensity distribution. The light distribution variable lamp 2 receives data indicating a light distribution pattern PTN from the lamp controlling device 8, emits a visible light beam L1 having an intensity distribution corresponding to the light distribution pattern PTN, and forms the light distribution pattern PTN in the space ahead of the vehicle. There is no particular limitation on the configuration of the light distribution variable lamp 2, and the light distribution variable lamp 2 may include, for example, a semiconductor light source, such as a laser diode (LD) or a light emitting diode (LED), and a lighting circuit that drives the semiconductor light source to turn it on.

In order to form an illuminance distribution corresponding to a given light distribution pattern PTN, the light distribution variable lamp 2 may include, for example, a pattern forming device of a matrix type, such as a digital mirror device (DMD) or a liquid crystal device, or a pattern forming device of a scan optics type that scans the space ahead of the host vehicle with light from a light source. The resolving power (the resolution) of the light distribution variable lamp 2 is, for example, from 1,000 pixels to 300,000 pixels. The time required for the light distribution variable lamp 2 to form a single light distribution pattern PTN is, for example, from 0.1 ms to 5 ms.

The imaging device 4 has a sensitivity to a visible light range and captures an image of a region ahead of the vehicle.

The imaging device 4 according to the present embodiment includes a high-speed camera 10 and a low-speed camera 12. The high-speed camera 10 has a relatively high frame rate, and its frame rate is, for example, from 200 fps to 10,000 fps (from 0.1 ms to 5 ms per frame). Meanwhile, the low-speed camera 12 has a frame rate lower than the frame rate of the high-speed camera 10, and the frame rate of the low-speed camera 12 is, for example, from 30 fps to 120 fps (from about 8 ms to 33 ms per frame).

The high-speed camera 10 has a relatively low resolution, and its resolution is, for example, from 300,000 pixels to less than 5,000,000 pixels. Meanwhile, the low-speed camera 12 has a relatively high resolution, and its resolution is, for example, no lower than 5,000,000 pixels. Accordingly, an image IMG1 that the high-speed camera 10 generates is of relatively low definition, whereas an image IMG2 that the low-speed camera 12 generates is of relatively high definition. In other words, an image IMG1 is of lower definition than an image IMG2, whereas an image IMG2 is of higher definition than an image IMG1. The resolution of the high-speed camera 10 and the resolution of the low-speed camera 12 are not limited to the numerical values mentioned above and can each be set to any value within a range of technological consistency.

The high-speed camera 10 and the low-speed camera 12 each capture an image of reflected light L2 of a visible light beam L1 reflected by an object located ahead of the vehicle. It suffices that the high-speed camera 10 and the low-speed camera 12 each have a sensitivity to a wavelength range of at least a visible light beam L1. Preferably, the high-speed camera 10 and the low-speed camera 12 are provided such that their respective angles of view coincide with each other.

The light distribution controlling device 6 executes ADB control of dynamically and adaptively controlling a light distribution pattern PTN to be supplied to the light distribution variable lamp 2 based on an image obtained from the imaging device 4. A light distribution pattern PTN can be regarded as a two-dimensional illuminance distribution of an illumination pattern 902 that the light distribution variable lamp 2 forms on a virtual vertical screen 900 located ahead of the host vehicle. The light distribution controlling device 6 can be formed by a digital processor. The light distribution controlling device 6 may be formed, for example but not limited to, by a combination of a microcomputer including a central processing unit (CPU) and a software program or by a field programmable gate array (FPGA) or an application specific integrated circuit (ASIC).

Figure 2:
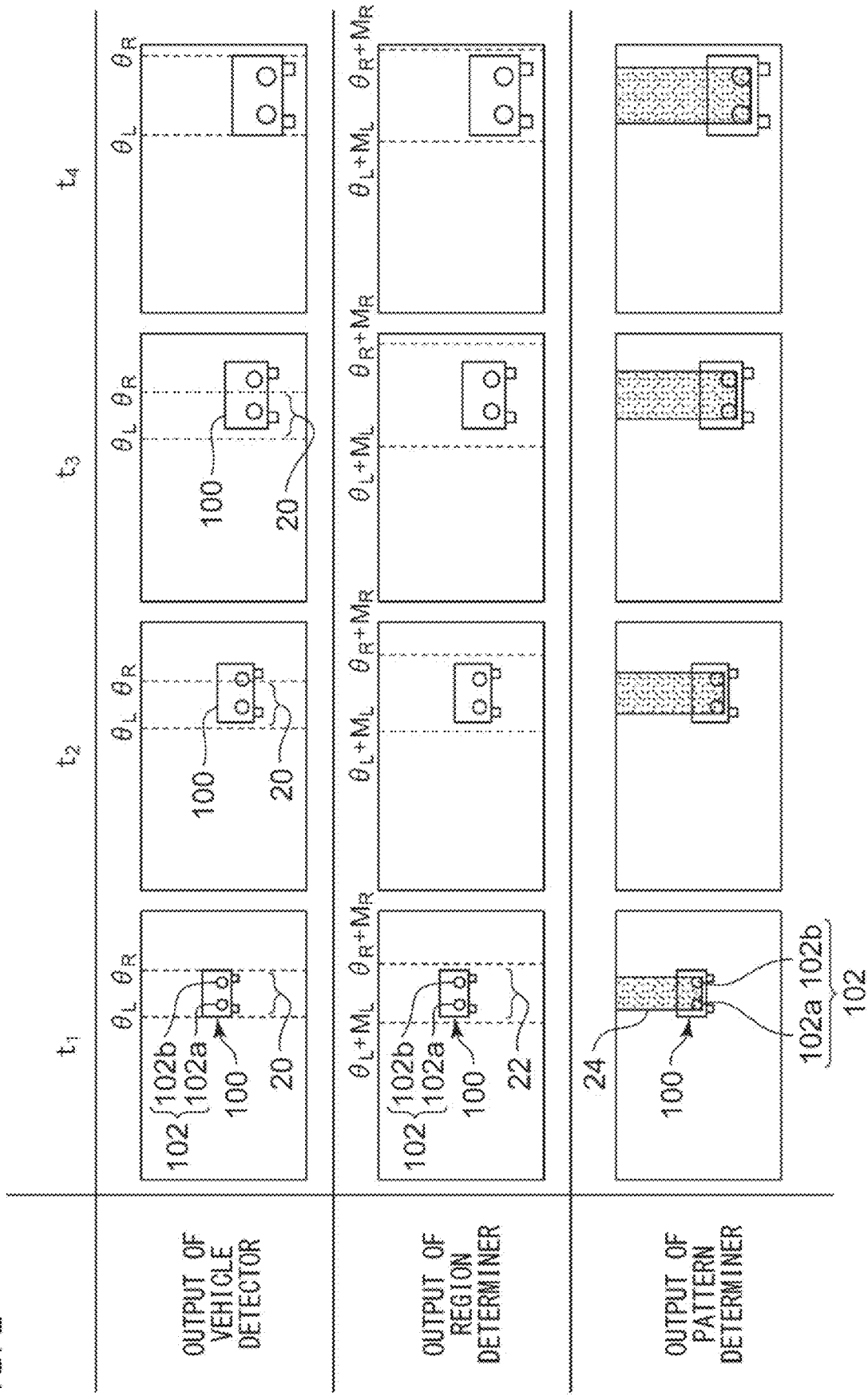
FIG. 2 is an illustration for describing an operation of a light distribution controlling device.

The light distribution controlling device 6 includes a vehicle detector 14, a region determiner 16, and a pattern determiner 18. These components each operate as an integrated circuit constituting the component executes a program stored in a memory. FIG. 2 is an illustration for describing an operation of the light distribution controlling device 6. The upper section illustrates results output from the vehicle detector 14, the middle section illustrates results output from the region determiner 16, and the lower section illustrates results output from the pattern determiner 18. The four images arrayed sideways in each section are results output from the corresponding component at respective times $t_1$ to $t_4$.

The vehicle detector 14 detects a front vehicle 100 through an image analysis on an image obtained from the imaging device 4. The vehicle detector 14 according to the present embodiment detects a front vehicle 100 based on a high-definition image IMG2 obtained from the low-speed camera 12. A front vehicle 100 includes a preceding vehicle and an oncoming vehicle. A front vehicle 100 includes a pair 102 of luminous points corresponding to its lamps. A pair 102 of luminous points corresponds to headlamps if the front vehicle 100 is an oncoming vehicle or corresponds to rear lamps if the front vehicle 100 is a preceding vehicle. A rear lamp includes a stop lamp and a tail lamp. A pair 102 of luminous points include a left luminous point 102a and a right luminous point 102b.

The vehicle detector 14 executes a high-precision image analysis by use of a known method including, for example, algorithm recognition or deep learning and outputs a result of the analysis at low speed. For example, the vehicle detector 14 can output a result of detecting a front vehicle 100 every 30 ms. In the example illustrated in FIG. 2, the vehicle detector 14 outputs a detection result at time $t_1$ and at time $t_4$.

The vehicle detector 14 generates, as the result of detecting a front vehicle 100, angle information of a presence region 20 of the front vehicle 100 relative to the host vehicle. This angle information includes an angle $\theta_L$ to the left end of the front vehicle 100 and an angle $\theta_R$ to the right end of the front vehicle 100. The left-end angle $\theta_L$ and the right-end angle $\theta_R$ are mapped to the angle of view of the low-speed camera 12 and match the positions of, respectively, the left end and the right end of the front vehicle 100 in an image IMG2. The vehicle detector 14 transmits a signal indicating this detection result to the region determiner 16.

The region determiner 16 sets a processing region 22 by adding a predetermined margin M in the widthwise direction (the right-left direction) of the vehicle to the presence region 20 of the front vehicle 100. The region determiner 16 adds a left margin $M_L$ to the left-end angle $\theta_L$ and a right margin $M_R$ to the right-end angle $\theta_R$. Accordingly, the processing region 22 is wider in the widthwise direction of the vehicle than the presence region 20 of the front vehicle 100 by the left margin $M_L$ and right margin $M_R$. The region determiner 16 generates angle information of a processing region 22 as information that indicates the result of determining the processing region 22 and transmits a signal that indicates this determination result to the pattern determiner 18.

The only process that the region determiner 16 executes is adding a margin M to a presence region 20 set by the vehicle detector 14. Therefore, the processing speed of the region determiner 16 is higher than the processing speed of the vehicle detector 14, and the region determiner 16 can, for example, output a result of determining a processing region 22 from every 0.1 ms to every 5 ms. In the example illustrated in FIG. 2, the region determiner 16 outputs a determination result at each of time $t_1$ to time $t_4$.

The pattern determiner 18 determines a light distribution pattern PTN in which light is blocked at a portion corresponding to a front vehicle 100, based on an image obtained from the imaging device 4. The pattern determiner 18 according to the present embodiment determines a light distribution pattern PTN based on an image IMG1 obtained from the high-speed camera 10. "Light being blocked at a certain portion" includes a case where the brightness (the illuminance) of that portion is lowered as well as a case where the brightness (the illuminance) of that portion is brought absolutely to zero.

In parallel with the process where the vehicle detector 14 detects a front vehicle 100, the pattern determiner 18 sets a light blocking portion 24 based on the pixel value of a pair 102 of luminous points included in a processing region 22 in an image IMG1 and located side by side in the widthwise direction of the vehicle. FIG. 3A to FIG. 3E are illustrations for describing an operation of the pattern determiner 18.

Figure 3A:
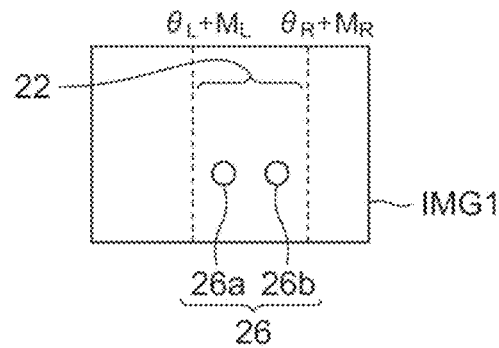
FIG. 3A to FIG. 3E are illustrations for describing an operation of a pattern determiner.

As illustrated in FIG. 3A, first, the pattern determiner 18 maps angle information of a processing region 22 received from the region determiner 16 onto an image IMG1 and thus sets the processing region 22 on the image IMG1. Then, the pattern determiner 18 extracts a pixel pair 26 corresponding to a pair 102 of luminous points based on the pixel value of each pixel, or specifically, the brightness value or the color value of each pixel in the processing region 22 on the image IMG1. The pixel pair 26 includes a left luminous point pixel 26*a* that overlaps a left luminous point 102*a* and a right luminous point pixel 26*b* that overlaps a right luminous point 102*b*.

Figure 3B:
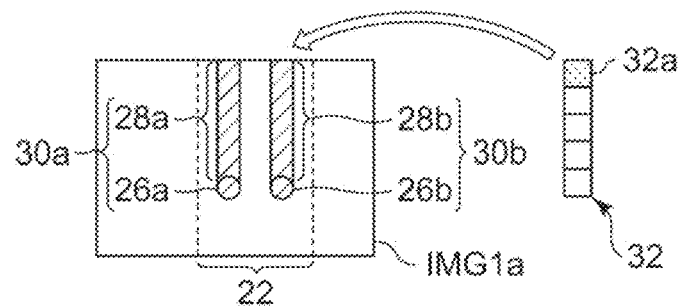

Next, as illustrated in FIG. 3B, the pattern determiner 18 sets, as an upper left dilating group 30*a*, the left luminous point pixel 26*a* and a predetermined number of upper left pixels 28*a* that are arrayed in the upward direction from the left luminous point pixel 26*a* in the image IMG1. Moreover, the pattern determiner 18 sets, as an upper right dilating group 30*b*, the right luminous point pixel 26*b* and a predetermined number of upper right pixels 28*b* that are arrayed in the upward direction from the right luminous point pixel 26*b* in the image IMG1.

The pattern determiner 18 according to the present embodiment, by use of a first structuring element 32 of a predetermined shape elongated in the up-down direction, maps a pixel at the upper end of the first structuring element 32 to a pixel 32*a* of interest and thus performs a dilation process on the processing region 22 in the image IMG1. Thus, in the image IMG1, the pixel value of the upper left pixels 28*a* is changed to the pixel value of the left luminous point pixel 26*a*, and the pixel value of the upper right pixels 28*b* is changed to the pixel value of the right luminous point pixel 26*b*. As a result, an upward dilated pattern image IMG1*a* that includes the upper left dilating group 30*a* and the upper right dilating group 30*b* is created.

Figure 3C:
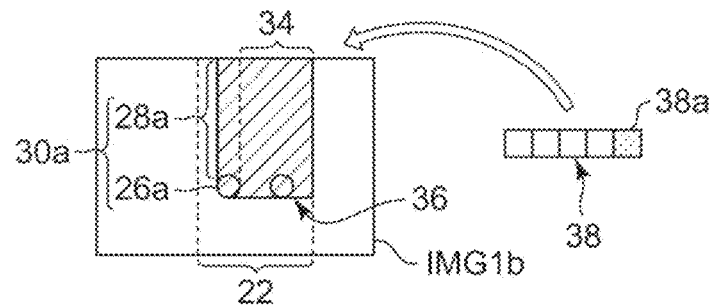

Next, as illustrated in FIG. 3C, the pattern determiner 18 sets, as a right dilating group 36, the upper left dilating group 30*a* and a predetermined number of right column pixels 34 that are arrayed in the right direction from the upper left dilating group 30*a* in the upward dilated pattern image IMG1*a*. The pattern determiner 18 according to the present embodiment, by use of a second structuring element 38 of a predetermined shape elongated in the widthwise direction of the vehicle, maps a pixel at the right end of the second structuring element 38 to a pixel 38*a* of interest and thus performs a dilation process on the processing region 22 in the upward dilated pattern image IMG1*a*. The second structuring element 38 has a length that can at least connect the upper left dilating group 30*a* and the upper right dilating group 30*b* through the dilation process. Thus, the pixel value of the right column pixels 34 is changed to the pixel value of the upper left dilating group 30*a* in the upward dilated pattern image IMG1*a*. As a result, a right dilated pattern image IMG1*b* that includes the right dilating group 36 is created.

Figure 3D:
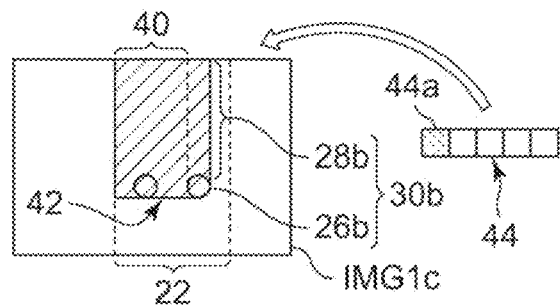

Moreover, as illustrated in FIG. 3D, the pattern determiner 18 sets, as a left dilating group 42, the upper right dilating group 30*b* and a predetermined number of left column pixels 40 that are arrayed in the left direction from the upper right dilating group 30*b* in the upward dilated pattern image IMG1*a*. The pattern determiner 18 according to the present embodiment, by use of a third structuring element 44 of a predetermined shape elongated in the widthwise direction of the vehicle, maps a pixel at the left end of the third structuring element 44 to a pixel 44*a* of interest and thus performs a dilation process on the processing region 22 in the upward dilated pattern image IMG1*a*.

The third structuring element 44 has a length that can at least connect the upper left dilating group 30*a* and the upper right dilating group 30*b* through the dilation process. Thus, the pixel value of the left column pixels 40 is changed to the pixel value of the upper right dilating group 30*b* in the upward dilated pattern image IMG1*a*. As a result, a left dilated pattern image IMG1*c* that includes the left dilating group 42 is created.

Figure 3E:
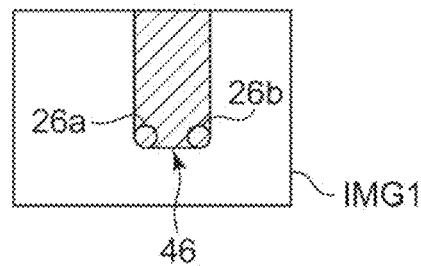

Then, as illustrated in FIG. 3E, the pattern determiner 18 incorporates a pixel region 46 where the right dilating group 36 and the left dilating group 42 overlap each other into a light blocking portion 24. The pattern determiner 18 according to the present embodiment combines the right dilated pattern image IMG1*b* and the left dilated pattern image IMG1*c*, that is, performs an AND operation on the right dilated pattern image IMG1*b* and the left dilated pattern image IMG1*c*. Thus, the pattern determiner 18 identifies the pixel region 46 where the right dilating group 36 and the left dilating group 42 overlap each other and sets the light blocking portion 24 such that the light blocking portion 24 includes this pixel region 46 (see FIG. 2).

Then, the pattern determiner 18 determines a light distribution pattern PTN that includes the light blocking portion 24. For example, the pattern determiner 18 sets a predetermined first illuminance to a region excluding the light blocking portion 24 and sets a second illuminance lower than the first illuminance to the light blocking portion 24. As described above, the second illuminance may be zero or an illuminance that is higher than zero but lower than the first illuminance. The pattern determiner 18 transmits data indicating this light distribution pattern PTN to the lamp controlling device 8.

The target of the process performed by the pattern determiner 18 is limited to a processing region 22 in an image IMG1. The pattern determiner 18 determines a light blocking portion 24 based on the pixel values (the brightness values, the color values, or the like) of the image IMG1. Specifically, the pattern determiner 18 determines a light blocking portion 24 by performing the dilation processes described above on an image IMG1 to convert the pixel value of each pixel. Accordingly, the process executed by the pattern determiner 18 is completed in a shorter period than a high-level image analysis executed by the vehicle detector 14. Therefore, the processing speed of the pattern determiner 18 is higher than the processing speed of the vehicle detector 14, and the pattern determiner 18 can, for example, output a result of determining a light distribution pattern PTN from every 0.1 ms to every 5 ms. In the example illustrated in FIG. 2, the pattern determiner 18 outputs a determination result at each of time $t_1$ to time $t_4$.

It is to be noted that the order of the process of creating a right dilated pattern image IMG1*b* illustrated in FIG. 3C and the process of creating a left dilated pattern image IMG1*c* illustrated in FIG. 3D is flexible, and these processes can be performed in parallel. Moreover, FIG. 3B to FIG. 3D illustrate the first structuring element 32 to the third structuring element 44 schematically, and the number of pixels forming each of the first structuring element 32 to the third structuring element 44 is not limited to what is depicted in the drawings. A presence region 20 and a processing region 22 may be defined in terms of not only the angular range in the widthwise direction of the vehicle but also the angular range in the up-down direction.

The lamp controlling device 8 controls the light distribution variable lamp 2 so that the light distribution variable lamp 2 emits a visible light beam L1 having an intensity distribution corresponding to a light distribution pattern PTN set by the pattern determiner 18. For example, in a case where the light distribution variable lamp 2 includes a DMD, the lamp controlling device 8 controls the on and off of the light source and the on/off switching of each mirror element forming the DMD. The lamp controlling device 8 can transmit a driving signal to the light distribution variable lamp 2, for example, every 0.1 ms to 5 ms.

This control makes it possible to form a light distribution pattern PTN having a light blocking portion 24 that overlaps a front vehicle 100 and to increase the visibility of the driver of the host vehicle without causing glare to the driver of the front vehicle 100. As described above, the pattern determiner 18 has a higher processing speed than the vehicle detector 14 and can determine a light blocking portion 24 and a light distribution pattern PTN at a frequency higher than the frequency at which the vehicle detector 14 outputs a detection result. Accordingly, this configuration allows a light blocking portion 24 to follow the movement of a front vehicle 100 with higher accuracy than a configuration where a light blocking portion 24 is set directly based on a detection result of the vehicle detector 14.

Moreover, as described above, the vehicle detector 14 has a relatively lower processing speed (i.e., a lower processing speed than the region determiner 16) and outputs a detection result at time $t_1$ and at time $t_4$ in the example illustrated in FIG. 2. Therefore, the presence region 20 set by the vehicle detector 14 partially fails to cover the front vehicle 100 at time $t_2$ and at time $t_3$. Meanwhile, the region determiner 16 has a relatively higher processing speed (i.e., a higher processing speed than the vehicle detector 14) and determines a processing region 22 at a frequency higher than the frequency at which the vehicle detector 14 outputs a detection result. Therefore, at time $t_2$ and at time $t_3$, the region determiner 16 sets the processing region 22 relative to the presence region 20 output from the vehicle detector 14 at time $t_1$. In other words, at a predetermined timing (times $t_2$, $t_3$), the region determiner 16 repeatedly sets a processing region 22 with respect to the same detection result (a presence region 20) obtained from the vehicle detector 14.

As the number of times the region determiner 16 sets a processing region 22 with respect to the same presence region 20 increases, the region determiner 16 gradually increases the size of the margin M. This causes the size of the processing region 22 to increase gradually. This configuration can reduce the likelihood that a front vehicle 100 goes outside a processing region 22 even when the front vehicle 100 has gone outside its presence region 20. Accordingly, the front vehicle 100 can be shaded more reliably. Moreover, setting a smaller margin M at an early stage of setting a processing region 22 makes it possible to set the processing speed of the pattern determiner 18 higher. Herein, the region determiner 16 restores the margin M to its initial value upon receiving a new detection result from the vehicle detector 14.

The pattern determiner 18 may identify whether a pair 102 of luminous points included in a processing region 22 is headlamps of an oncoming vehicle or rear lamps of a preceding vehicle. For example, the pattern determiner 18 performs a gray scale conversion process on a processing region 22. Then, the pattern determiner 18 binarizes the brightness value of each pixel and thereby extracts headlamps. In addition, the pattern determiner 18 performs an HSV conversion process on a processing region 22. Then, the pattern determiner 18 binarizes the color value of each pixel and thereby extracts rear lamps. Thereafter, the pattern determiner 18 performs an OR operation on the image obtained as a result of extracting the headlamps and the image obtained as a result of extracting the rear lamps. Thus, the pattern determiner 18 generates an image that includes a pixel pair 26 corresponding to the headlamps and a pixel pair 26 corresponding to the rear lamps and, based on these images, obtains an upward dilated pattern image IMG1a that includes an upper left dilating group 30a and an upper right dilating group 30b.

In one example, in a case where a light blocking portion 24 is set for a pixel pair 26 corresponding to the headlamps of an oncoming vehicle, the pattern determiner 18 sets a pixel region 46 where a right dilating group 36 and a left dilating group 42 overlap each other as the light blocking portion 24. Meanwhile, in a case where a light blocking portion 24 is set for a pixel pair 26 corresponding to the rear lamps of a preceding vehicle, the pattern determiner 18 sets a region obtained by adding a predetermined margin to each of the right and left of a pixel region 46 as the light blocking portion 24. This predetermined margin corresponds to a region that overlaps each sideview mirror of the preceding vehicle. This configuration can further suppress glare caused to the driver of the preceding vehicle.

Figures 4A, 4B:
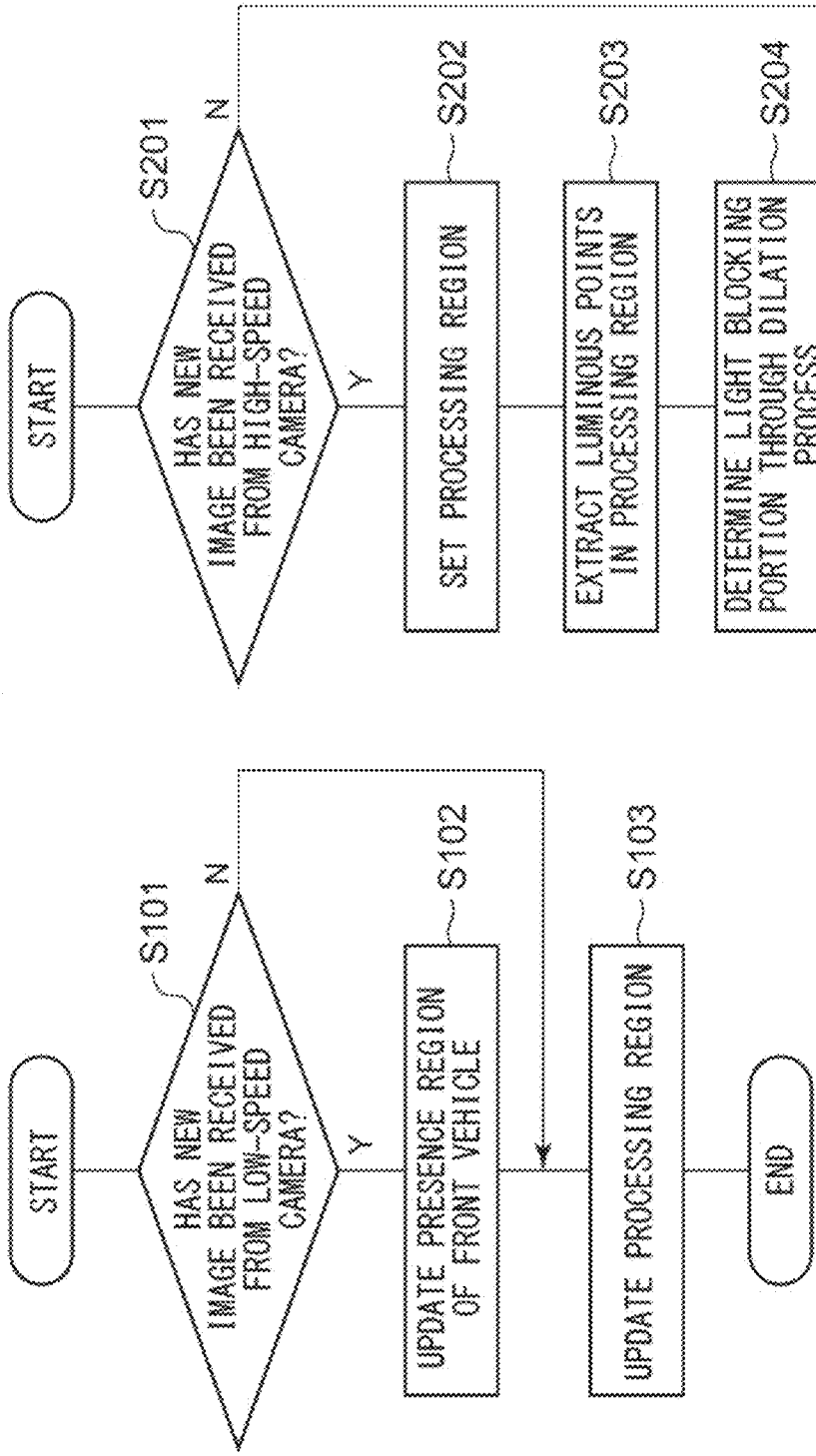
FIG. 4A and FIG. 4B are each a flowchart illustrating an example of ADB control executed by a light distribution controlling device according to Embodiment 1.

FIG. 4A and FIG. 4B are each a flowchart illustrating an example of ADB control executed by the light distribution controlling device 6 according to Embodiment 1. This flow is executed repeatedly at predetermined timings, for example, when the light distribution controlling device 6 is instructed to execute the ADB control via a light switch (not illustrated) and when the ignition is on, and the flow is terminated when the instruction to execute the ADB control is canceled (or upon the light distribution controlling device 6 instructed to stop the ADB control) or when the ignition is turned off. The flow illustrated in FIG. 4A and the flow illustrated in FIG. 4B are executed in parallel.

As illustrated in FIG. 4A, the light distribution controlling device 6 determines whether the light distribution controlling device 6 has received a new image IMG2 from the low-speed camera 12 (S101). If the light distribution controlling device 6 has received a new image IMG2 (Y at S101), the light distribution controlling device 6 detects a front vehicle 100 based on the received image IMG2 and updates a presence region 20 (S102). Then, the light distribution controlling device 6 updates a processing region 22 based on the obtained presence region 20 (S103) and terminates this routine. If the light distribution controlling device 6 has not received a new image IMG2 from the low-speed camera 12 (N at S101), the light distribution controlling device 6 updates a processing region 22 based on an already acquired presence region 20 (S103).

Meanwhile, as illustrated in FIG. 4B, the light distribution controlling device 6 determines whether the light distribution controlling device 6 has received a new image IMG1 from the high-speed camera 10 (S201). If the light distribution controlling device 6 has not received a new image IMG1 (N at S201), the light distribution controlling device 6 terminates this routine. If the light distribution controlling device 6 has received a new image IMG1 (Y at S201), the light distribution controlling device 6 sets the processing region 22 updated at step S103 in the image IMG1 (S202). Then, the light distribution controlling device 6 extracts luminous points in the processing region 22, that is, extracts a pixel pair 26 (S203). Then, the light distribution controlling device 6 determines a light blocking portion 24 through a dilation process (S204). Then, the light distribution controlling device 6 transmits data indicating a new light distribution pattern PTN to the lamp controlling device 8 to update the light distribution pattern PTN (S205) and terminates this routine.

As described above, the light distribution controlling device 6 according to the present embodiment includes the vehicle detector 14, the region determiner 16, and the pattern determiner 18. The vehicle detector 14 detects a front vehicle through an image analysis on an image obtained from the imaging device 4 that captures an image of a region ahead of the vehicle. The region determiner 16 sets a processing region 22 by adding a predetermined margin M in the widthwise direction of the vehicle to a presence region 20 of a front vehicle 100. The pattern determiner 18, in parallel with the detection of the front vehicle 100 by the vehicle detector 14, sets a light blocking portion 24 based on the pixel value of a pair 102 of luminous points included in the processing region 22 and appearing side by side in the widthwise direction of the vehicle in the image obtained from the imaging device 4 and determines a light distribution pattern PTN that includes the light blocking portion 24.

The pattern determiner 18 determines the light blocking portion 24 based on the pixel values of the image. Therefore, the pattern determiner 18 can execute the process at a higher speed than the vehicle detector 14 that executes the image analysis. Moreover, the image region on which the pattern determiner 18 executes the process is limited to the processing region 22. In addition, the pattern determiner 18 executes the process in parallel with the process by the vehicle detector 14. Therefore, the light distribution controlling device 6 according to the present embodiment can update the light distribution pattern PTN at a high frequency. This configuration allows the light blocking portion 24 to follow the movement of the front vehicle 100 with high accuracy.

In conventional ADB control in which a front vehicle is detected through an image analysis and a light blocking portion is determined based directly on the result of the image analysis, the light blocking portion is given a margin in consideration of a mismatch between the light blocking portion and the front vehicle caused by a delay in the process of determining the light blocking portion. In contrast, according to the present embodiment, the light blocking portion 24 can be matched to the front vehicle 100 with high accuracy, and this can help reduce the margin that is given to the light blocking portion. Accordingly, the visibility of the driver can be improved.

Moreover, in the image obtained from the imaging device 4, the pattern determiner 18 according to the present embodiment sets, as an upper left dilating group 30a, a left luminous point pixel 26a that overlaps a left luminous point 102a in the pair 102 of luminous points and a predetermined number of upper left pixels 28a that are arrayed in the upward direction from the left luminous point pixel 26a and sets, as an upper right dilating group 30b, a right luminous point pixel 26b that overlaps a right luminous point 102b and a predetermined number of upper right pixels 28b that are arrayed in the upward direction from the right luminous point pixel 26b. In addition, the pattern determiner 18 sets, as a right dilating group 36, the upper left dilating group 30a and a predetermined number of right column pixels 34 that are arrayed in the right direction from the upper left dilating group 30a and sets, as a left dilating group 42, the upper right dilating group 30b and a predetermined number of left column pixels 40 that are arrayed in the left direction from the upper right dilating group 30b. Furthermore, the pattern determiner 18 incorporates a pixel region 46 where the right dilating group 36 and the left dilating group 42 overlap each other into the light blocking portion 24. This configuration can further increase the processing speed of the light distribution controlling device 6.

Furthermore, in the image obtained from the imaging device 4, the pattern determiner 18 changes the pixel value of the upper left pixels 28a to the pixel value of the left luminous point pixel 26a and changes the pixel value of the upper right pixels 28b to the pixel value of the right luminous point pixel 26b. Thus, the pattern determiner 18 creates an upward dilated pattern image IMG1a that includes the upper left dilating group 30a and the upper right dilating group 30b. Moreover, in the upward dilated pattern image IMG1a, the pattern determiner 18 changes the pixel value of the right column pixels 34 to the pixel value of the upper left dilating group 30a. Thus, the pattern determiner 18 creates a right dilated pattern image IMG1b that includes the right dilating group 36. In addition, in the upward dilated pattern image IMG1a, the pattern determiner 18 changes the pixel value of the left column pixels 40 to the pixel value of the upper right dilating group 30b. Thus, the pattern determiner 18 creates a left dilated pattern image IMG1c that includes the left dilating group 42. Furthermore, the pattern determiner 18 sets the light blocking portion 24 by combining the right dilated pattern image IMG1b and the left dilated pattern image IMG1c. This configuration can further increase the processing speed of the light distribution controlling device 6.

Meanwhile, the region determiner 16 repeatedly sets the processing region 22 relative to the same detection result obtained from the vehicle detector 14 and gradually increases the size of the margin M as the number of times the processing region 22 is set increases. This configuration makes it possible to shade the presence region 20 of the front vehicle 100 more reliably.

The imaging device 4 includes the high-speed camera 10 and the low-speed camera 12 that has a frame rate lower than the frame rate of the high-speed camera 10. The vehicle detector 14 detects the front vehicle 100 based on an image IMG2 obtained from the low-speed camera 12, and the pattern determiner 18 determines the light distribution pattern PTN based on an image IMG1 obtained from the high-speed camera 10. This configuration makes it possible to execute the ADB control with higher accuracy. Assigning a camera to each of the vehicle detector 14 and the pattern determiner 18 makes it possible to adopt cameras specialized for the performance required for the respective processes. Typically, a camera having performance required for both the process of the vehicle detector 14 and the process of the pattern determiner 18 is expensive. As such, according to the present embodiment, the cost of the imaging device 4 can be reduced, and in turn the cost of the vehicle lamp system 1 can be reduced.

Thus far, Embodiment 1 according to the present invention has been described in detail. Embodiment 1 described above merely illustrates a specific example for implementing the present invention. The content of Embodiment 1 does not limit the technical scope of the present invention, and a number of design changes, including modification, addition, and deletion of a constituent element, can be made within the scope that does not depart from the sprit of the invention defined by the claims. A new embodiment resulting from adding a design change has advantageous effects of the embodiment combined as well as advantageous effects of the variation. With regard to Embodiment 1 described above, the expressions "according to the present embodiment," "in the present embodiment," and so on are added for emphasis to the content that can be subjected to such a design change as described above, but such a design change is also permitted on the content without these expressions. A desired combination of the constituent elements described above is also valid as an aspect of the present invention. Hatching added along a section in the drawings does not limit the material of such with hatching.

A single camera may fill both the function of the high-speed camera 10 and the function of the low-speed camera 12. For example, the low-speed camera 12 may be omitted if the high-speed camera 10 and the low-speed camera 12 have an equivalent resolution or if, while the high-speed camera 10 has a low resolution, the vehicle detector 14 is equipped with an algorithm that allows the vehicle detector 14 to detect a vehicle at a sufficient level with this low resolution. This configuration makes it possible to reduce the size of the vehicle lamp system 1.

The invention according to Embodiment 1 described above may be identified through the items indicated below.

(Item 1)

A light distribution controlling method, comprising:
detecting a front vehicle 100 through image processing on an image obtained from an imaging device 4 that captures an image of a region ahead of a vehicle;
setting a processing region 22 by adding a predetermined margin M in a widthwise direction of the vehicle to a presence region 20 of the front vehicle 100; and
in parallel with the detecting of the front vehicle 100, setting a light blocking portion 24 based on a pixel value of a pair 102 of luminous points included in the processing region 22 and appearing side by side in the widthwise direction of the vehicle in the image obtained from the imaging device 4 and determining a light distribution pattern PTN that includes the light blocking portion 24.

(Item 2)

The light distribution controlling method according to Item 1, wherein
the determining of the light distribution pattern PTN includes
setting, in the image, a left luminous point pixel 26a that overlaps a left luminous point 102a in the pair 102 of luminous points and a predetermined number of upper left pixels 28a that are arrayed in an upward direction from the left luminous point pixel 26a as an upper left dilating group 30a, and setting, in the image, a right luminous point pixel 26b that overlaps a right luminous point 102b and a predetermined number of upper right pixels 28b that are arrayed in the upward direction from the right luminous point pixel 26b as an upper right dilating group 30b,
setting the upper left dilating group 30a and a predetermined number of right column pixels 34 that are arrayed in a right direction from the upper left dilating group 30a as a right dilating group 36,
setting the upper right dilating group 30b and a predetermined number of left column pixels 40 that are arrayed in a left direction from the upper right dilating group 30b as a left dilating group 42, and
setting a pixel region 46 where the right dilating group 36 and the left dilating group 42 overlap each other as the light blocking portion 24.

(Item 3)

The light distribution controlling method according to Item 2, wherein
the determining of the light distribution pattern PTN includes
creating an upward dilated pattern image IMG1a that includes the upper left dilating group 30a and the upper right dilating group 30b by changing a pixel value of the upper left pixels 28a to a pixel value of the left luminous point pixel 26a and changing a pixel value of the upper right pixels 28b to a pixel value of the right luminous point pixel 26b in the image,
creating a right dilated pattern image IMG1b that includes the right dilating group 36 by changing a pixel value of the right column pixels 34 to a pixel value of the upper left dilating group 30a in the upward dilated pattern image IMG1a,
creating a left dilated pattern image IMG1c that includes the left dilating group 42 by changing a pixel value of the left column pixels 40 to a pixel value of the upper right dilating group 30b in the upward dilated pattern image IMG1a, and
setting the light blocking portion 24 by combining the right dilated pattern image IMG1b and the left dilated pattern image IMG1c.

Embodiment 2

Figure 5:
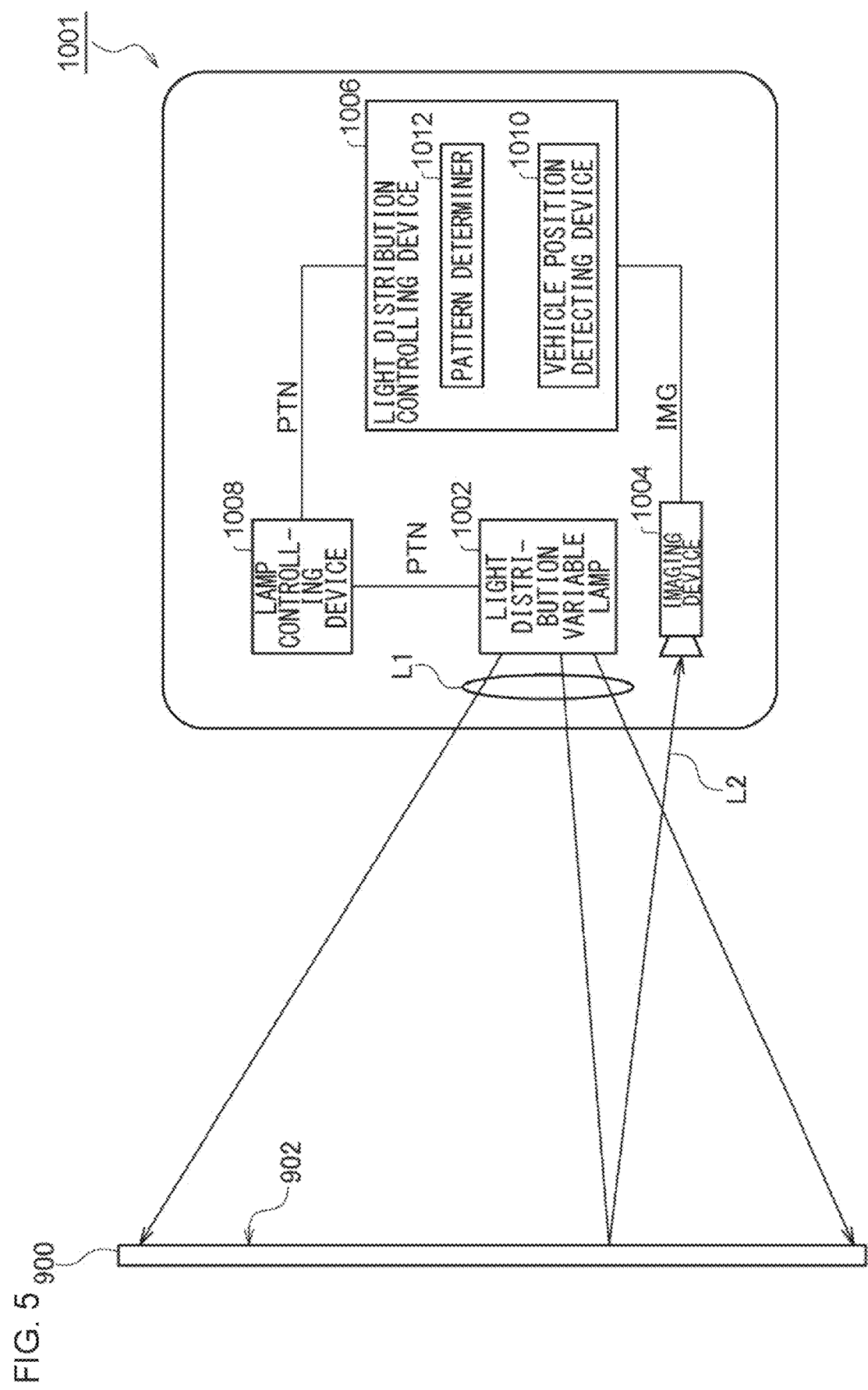
FIG. 5 is a block diagram of a vehicle lamp system according to Embodiment 2.

FIG. 5 is a block diagram of a vehicle lamp system according to Embodiment 2. FIG. 5 depicts some of the constituent elements of a vehicle lamp system 1001 in the form of functional blocks. These functional blocks are implemented, in terms of their hardware configuration, by elements and/or circuits, such as a CPU or a memory of a computer, or implemented, in terms of their software configuration, by a computer program or the like. It is to be appreciated by a person skilled in the art that these functional blocks can be implemented in a variety of forms through combinations of hardware and software.

The vehicle lamp system 1001 includes a light distribution variable lamp 1002, an imaging device 1004, a light distribution controlling device 1006, and a lamp controlling device 1008. These members may be embedded within a single chassis, or some of the members may be provided outside a chassis, that is, provided in the vehicle.

The light distribution variable lamp 1002 is a white light source that can illuminate a region ahead of the vehicle with a visible light beam L1 of a variable intensity distribution. The light distribution variable lamp 1002 receives data indicating a light distribution pattern PTN from the lamp controlling device 1008, emits a visible light beam L1 having an intensity distribution corresponding to the light distribution pattern PTN, and forms the light distribution pattern PTN in the space ahead of the vehicle. There is no particular limitation on the configuration of the light distribution variable lamp 1002, and the light distribution variable lamp 1002 may include, for example, a semiconductor light source, such as a laser diode (LD) or a light emitting diode (LED), and a lighting circuit that drives the semiconductor light source to turn it on.

In order to form an illuminance distribution corresponding to a given light distribution pattern PTN, the light distribution variable lamp 1002 may include, for example, a pattern forming device of a matrix type, such as a digital mirror device (DMD) or a liquid crystal device, or a pattern forming device of a scan optics type that scans a space ahead of the host vehicle with light from a light source. The resolving power (the resolution) of the light distribution variable lamp 1002 is, for example, from 1,000 pixels to 300,000 pixels.

The imaging device 1004 has a sensitivity to a visible light range and captures an image of a region ahead of the vehicle. The imaging device 1004 captures an image of reflected light L2 of a visible light beam L1 reflected by an object located ahead of the vehicle. It suffices that the imaging device 1004 have a sensitivity to a wavelength range of at least a visible light beam L1.

The light distribution controlling device 1006 executes ADB control of dynamically and adaptively controlling a light distribution pattern PTN to be supplied to the light distribution variable lamp 1002 based on an image IMG obtained from the imaging device 1004. A light distribution pattern PTN can be regarded as a two-dimensional illuminance distribution of an illumination pattern 902 that the light distribution variable lamp 1002 forms on a virtual vertical screen 900 located ahead of the host vehicle. The light distribution controlling device 1006 can be formed by a digital processor. The light distribution controlling device 1006 may be formed, for example but not limited to, by a combination of a microcomputer including a CPU and a software program or by a field programmable gate array (FPGA) or an application specific integrated circuit (ASIC).

Figure 6:
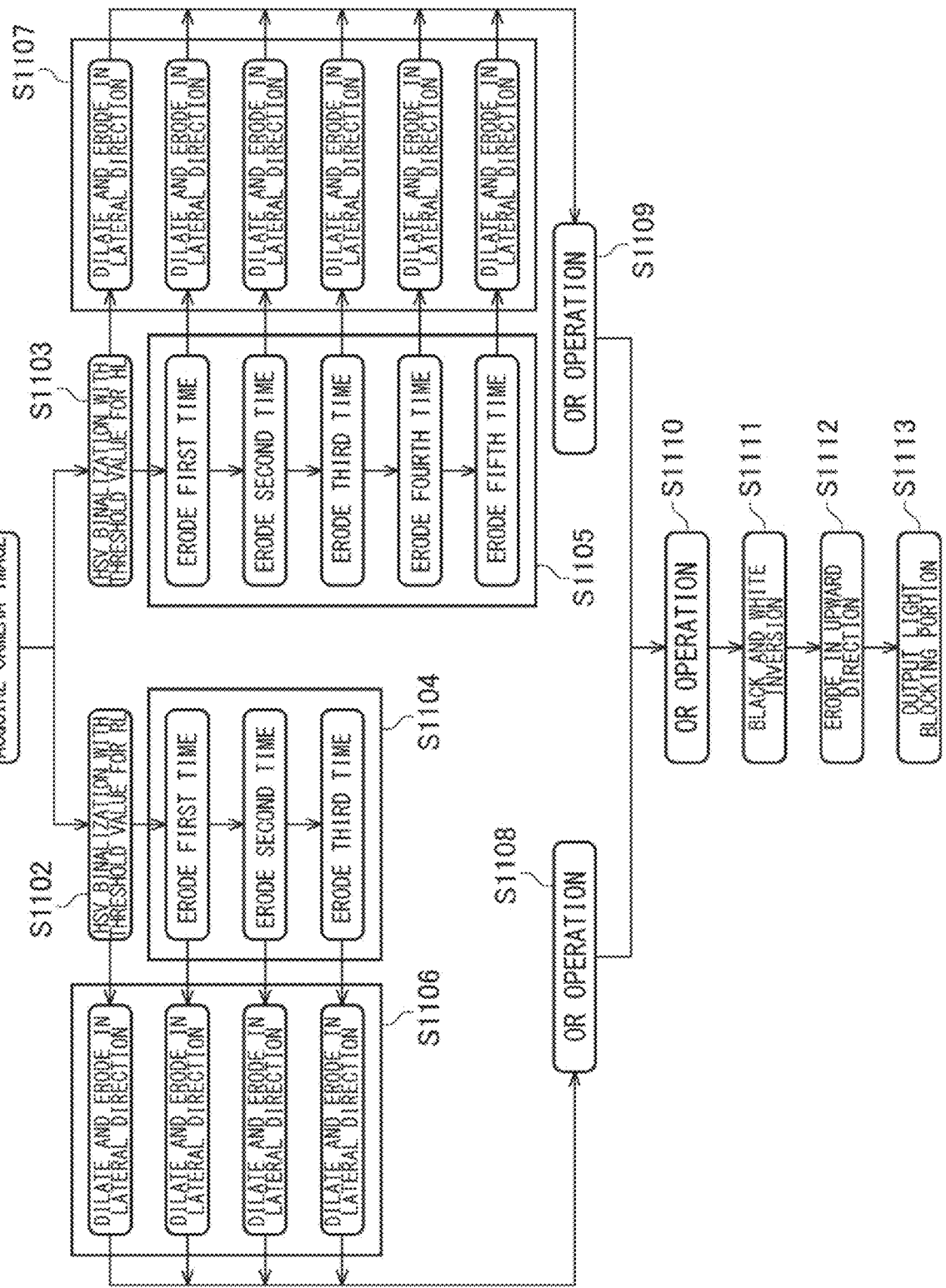
FIG. 6 is an illustration for describing a flow of control executed by a light distribution controlling device.

The light distribution controlling device 1006 includes a vehicle position detecting device 1010 and a pattern determiner 1012. These components each operate as an integrated circuit constituting the component executes a program stored in a memory. FIG. 6 is an illustration for describing a flow of control executed by the light distribution controlling device 1006. FIG. 7A to FIG. 7C, FIG. 8A to FIG. 8D, FIG. 9A to FIG. 9C, FIG. 10A to FIG. 10F, FIG. 11A to FIG. 11F and FIG. 12A to FIG. 12D each illustrate a structuring element used or an image generated in the control executed by the light distribution controlling device 1006.

The vehicle position detecting device 1010 detects the position of a front vehicle, including an oncoming vehicle or a preceding vehicle, by performing predetermined image processing on an image that is based on the imaging device 1004. An image that is based on the imaging device 1004 includes not only an image IMG obtained directly from the imaging device 1004 but also an image obtained by subjecting the image IMG to predetermined image processing, that is, an image derived from the directly obtained image IMG.

Figure 7A:
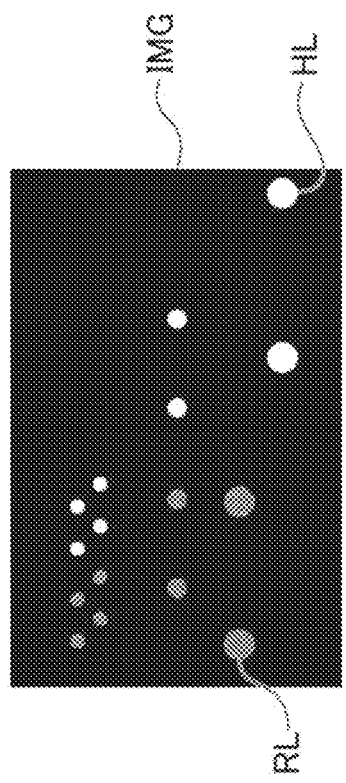
FIG. 7A to FIG. 7C each illustrate an image generated in the control executed by a light distribution controlling device.

First, the vehicle position detecting device 1010 acquires an image IMG (a camera image) from the imaging device 1004 (S1101). As illustrated in FIG. 7A, the image IMG obtained from the imaging device 1004 includes luminous points corresponding to rear lamps RL of preceding vehicles (hereinafter, also referred to simply as rear lamps RL) and luminous points corresponding to headlamps HL of oncoming vehicles (hereinafter, also referred to simply as headlamps HL). A rear lamp RL includes a stop lamp and a tail lamp.

Figure 7C:
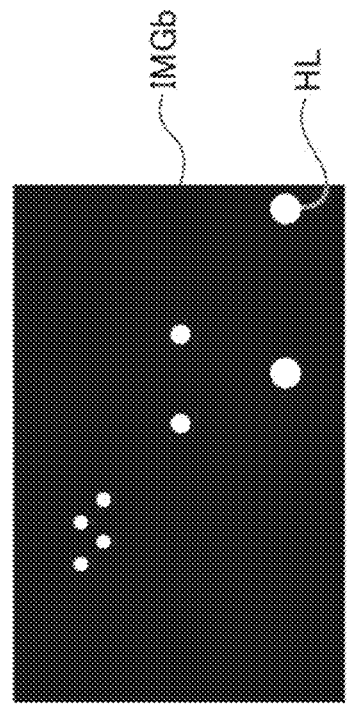
Figure 7B:
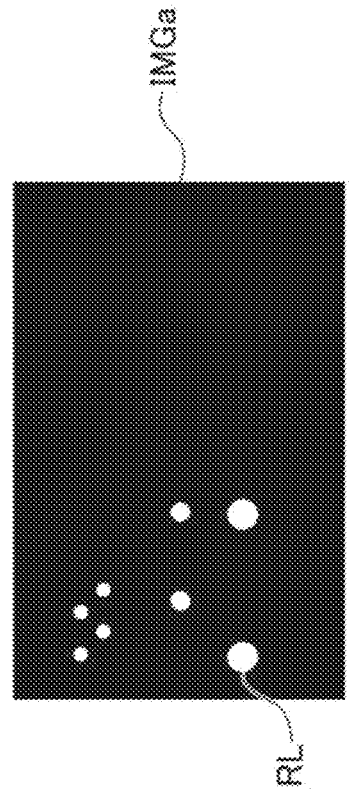

The vehicle position detecting device 1010 performs an HSV conversion process on the image IMG and performs a binarization process on an HSV image by use of a predetermined threshold value for the rear lamps RL (S1102). Thus, a rear lamp image IMGa where the rear lamps RL have been extracted is obtained, as illustrated in FIG. 7B. In the rear lamp image IMGa, pixels corresponding to the rear lamps RL have a high pixel value, and the remaining pixels have a low pixel value.

In addition, the vehicle position detecting device 1010 performs an HSV conversion process on the image IMG and performs a binarization process on an HSV image by use of a predetermined threshold value for the headlamps HL (S1103). Thus, a headlamp image IMGb where the headlamps HL have been extracted is obtained, as illustrated in FIG. 7C. In the headlamp image IMGb, pixels corresponding to the headlamps HL have a high pixel value, and the remaining pixels have a low pixel value.

Herein, the order of the process of extracting the rear lamps RL (step S1102) and the process of extracting the headlamps HL (step S1103) is flexible, and these processes can be performed in parallel. In addition, there is no particular limitation on the method used in each extracting process, and a known method can be employed.

Figure 8A:
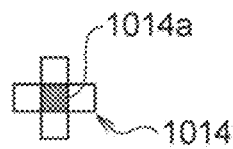
FIG. 8A to FIG. 8D each illustrate a structuring element used or an image generated in the control executed by a light distribution controlling device.

The vehicle position detecting device 1010 performs a second erosion process a predetermined number of times on the image that is based on the imaging device 1004, or specifically, on the rear lamp image IMGa by use of a second structuring element 1014 of a predetermined shape illustrated in FIG. 8A (S1104). FIG. 6 indicates that the second erosion process is performed three times on the rear lamp image IMGa, but this is not a limiting example, and this number can be set as desired.

The second structuring element 1014 according to the present embodiment is cross-shaped. The vehicle position detecting device 1010 performs the second erosion process on the rear lamp image IMGa with the center pixel of the second structuring element 1014 mapped to a pixel 1014a of interest. FIG. 8A schematically illustrates the second structuring element 1014, and the number of pixels forming the respective portions that extend upward, downward, rightward, and leftward from the center pixel of the second structuring element 1014 is not limited to what is depicted in the drawing.

In the second erosion process, if the pixels that overlap the second structuring element 1014 include a pixel of a low pixel value, the pixel value of the pixel 1014a of interest is changed to this low pixel value. Therefore, the luminous points are deleted successively from a smaller luminous point as the number of times the second erosion process is performed increases. Normally, the size of a headlamp HL or a rear lamp RL of a front vehicle appears greater as the front vehicle is located closer to the host vehicle. Therefore, the headlamps HL or the rear lamps RL are deleted successively from those of the front vehicle located farther from the host vehicle as the number of times the second erosion process is performed increases.

The vehicle position detecting device 1010 generates a first image that includes a pair of rear lamps RL located at a predetermined first distance and a pair of rear lamps RL located at a second distance farther than the first distance with the number of times the second erosion process is performed on the rear lamp image IMGa set to a relatively low number. In addition, the vehicle position detecting device 1010 generates a second image that includes the pair of rear lamps RL located at the first distance and in which the pair of rear lamps RL located at the second distance has been deleted with the number of times the second erosion process is performed set to a relatively high number. In other words, the number of times the second erosion process is performed in generating a first image is lower than the number of times the second erosion process is performed in generating a second image, and the number of times the second erosion process is performed in generating a second image is higher than the number of times the second erosion process is performed in generating a first image.

Figure 8B:
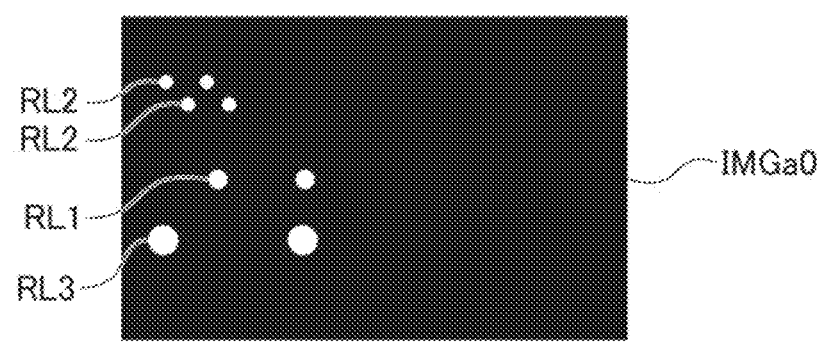
Figure 8C:
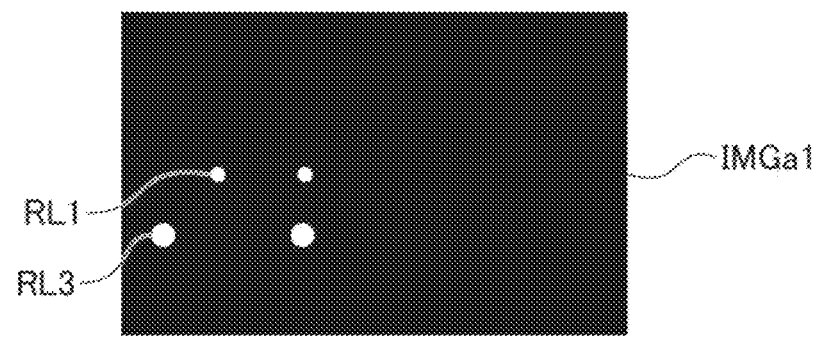
Figure 8D:
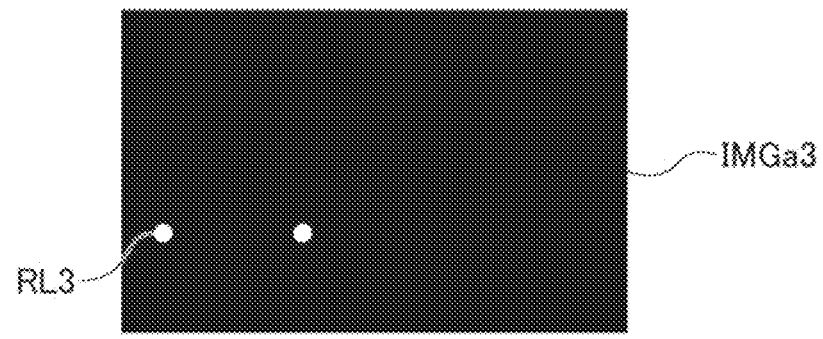

FIG. 8B shows a rear lamp image IMGa0 obtained when the second erosion process has been performed zero times. FIG. 8C shows a rear lamp image IMGa1 obtained when the second erosion process has been performed once. FIG. 8D shows a rear lamp image IMGa3 obtained when the second erosion process has been performed three times. Herein, the vehicle position detecting device 1010 also generates a rear lamp image IMGa by performing the second erosion process two times, but the illustration thereof is omitted.

The rear lamp image IMGa0 includes a pair RL1 of rear lamps RL located at a predetermined first distance and pairs RL2 of rear lamps RL located at a second distance farther than the first distance. Meanwhile, the rear lamp image IMGa1 includes the pair RL1 of rear lamps RL located at the first distance, but the pairs RL2 of rear lamps RL located at the second distance have been deleted in the rear lamp image IMGa1. Therefore, the rear lamp image IMGa0 corresponds to a first image, and the rear lamp image IMGa1 corresponds to a second image. Herein, the rear lamp images IMGa0 and IMGa1 each include a pair RL3 of rear lamps RL located closer than the pair RL1 of rear lamps RL.

The rear lamp image IMGa1 includes the pair RL3 of rear lamps RL located at a predetermined first distance and the pair RL1 of rear lamps RL located at a second distance farther than the first distance. Meanwhile, the rear lamp image IMGa3 includes the pair RL3 of rear lamps RL located at the first distance, but the pair RL1 of rear lamps RL located at the second distance has been deleted in the rear lamp image IMGa3. Therefore, the rear lamp image IMGa1 corresponds to a first image, and the rear lamp image IMGa3 corresponds to a second image.

The vehicle position detecting device 1010 executes a similar process on the headlamp image IMGb as well. In other words, the vehicle position detecting device 1010 performs the second erosion process a predetermined number of times on the headlamp image IMGb by use of the second structuring element 1014 illustrated in FIG. 8A (S1105). FIG. 6 indicates that the second erosion process is performed five times on the headlamp image IMGb, but this is not a limiting example, and this number can be set as desired.

The vehicle position detecting device 1010 generates a first image that includes a pair of headlamps HL located at a predetermined first distance and a pair of headlamps HL located at a second distance farther than the first distance with the number of times the second erosion process is performed on the headlamp image IMGb set to a relatively low number. In addition, the vehicle position detecting device 1010 generates a second image that includes the pair of headlamps HL located at the first distance and in which the pair of headlamps HL located at the second distance has been deleted with the number of times the second erosion process is performed set to a relatively high number. In other words, the number of times the second erosion process is performed in generating a first image is lower than the number of times the second erosion process is performed in generating a second image, and the number of times the second erosion process is performed in generating a second image is higher than the number of times the second erosion process is performed in generating a first image.

Figure 9A:
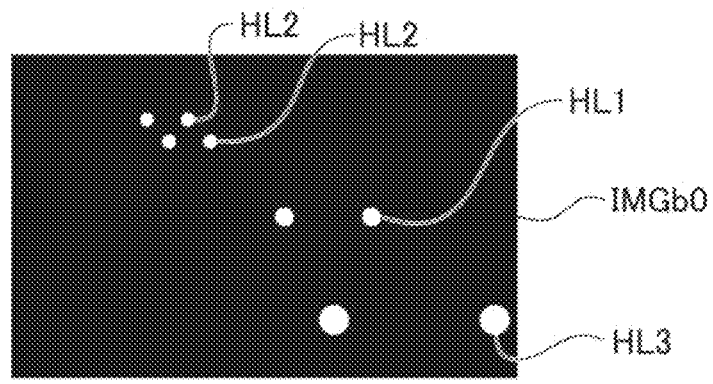
FIG. 9A to FIG. 9C each illustrate an image generated in the control executed by a light distribution controlling device.
Figure 9B:
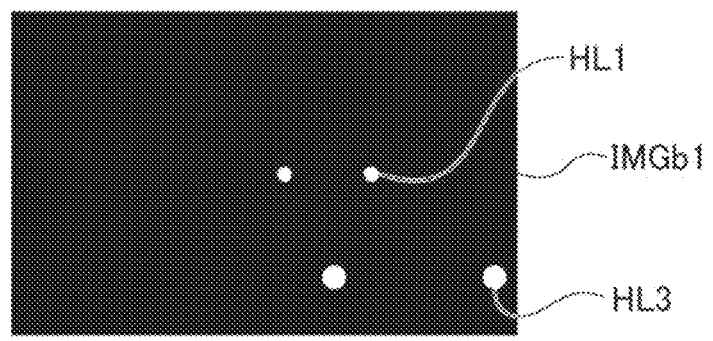
Figure 9C:
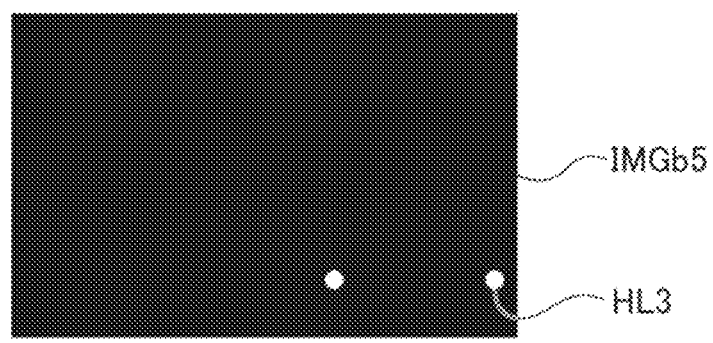

FIG. 9A shows a headlamp image IMGb0 obtained when the second erosion process has been performed zero times. FIG. 9B shows a headlamp image IMGb1 obtained when the second erosion process has been performed once. FIG. 9C shows a headlamp image IMGb5 obtained when the second erosion process has been performed five times. Herein, the vehicle position detecting device 1010 also generates headlamp images IMGb by performing the second erosion process two to four times, but the illustration thereof is omitted.

The headlamp image IMGb0 includes a pair HL1 of headlamps HL located at a predetermined first distance and pairs HL2 of headlamps HL located at a second distance farther than the first distance. Meanwhile, the headlamp image IMGb1 includes the pair HL1 of headlamps HL located at the first distance, but the pairs HL2 of headlamps HL located at the second distance have been deleted in the headlamp image IMGb1. Therefore, the headlamp image IMGb0 corresponds to a first image, and the headlamp image IMGb1 corresponds to a second image. Herein, the head lamp images IMGb0 and IMGb1 each include a pair HL3 of headlamps HL located closer than the pair HL1 of headlamps HL.

The headlamp image IMGb1 includes the pair HL3 of headlamps HL located at a predetermined first distance and the pair HL1 of headlamps HL located at a second distance farther than the first distance. Meanwhile, the headlamp image IMGb5 includes the pair HL3 of headlamps HL located at the first distance, but the pair HL1 of headlamps HL located at the second distance has been deleted in the headlamp image IMGb5. Therefore, the headlamp image IMGb1 corresponds to a first image, and the headlamp image IMGb5 corresponds to a second image.

Herein, the order of the second erosion process performed on the rear lamp image IMGa (step S1104) and the second erosion process performed on the headlamp image IMGb (step S1105) is flexible, and these processes can be performed in parallel.

Figure 10A:
FIG. 10A to FIG. 10F each illustrate a structuring element used or an image generated in the control executed by a light distribution controlling device.
Figure 10B:
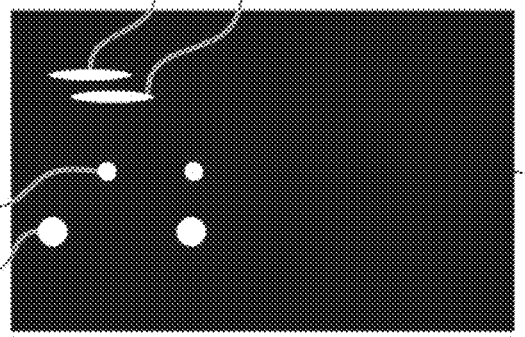
Figure 10C:
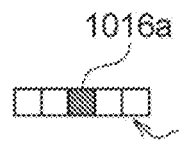
Figure 10D:
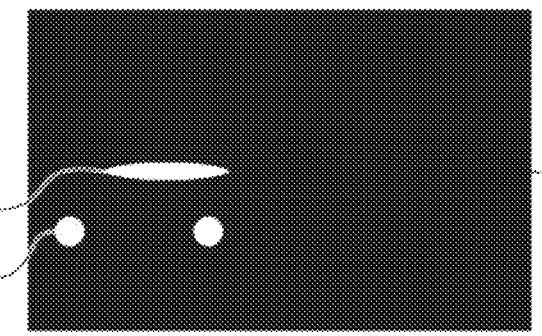
Figure 10E:
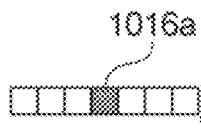

The vehicle position detecting device 1010 performs a first dilation process and a first erosion process on images that are based on the imaging device 1004, or specifically, on the rear lamp images IMGa0 to IMGa3 by use of respective first structuring elements 1016 of a predetermined shape illustrated in FIG. 10A, FIG. 10C, and FIG. 10E (S1106).

The first structuring elements 1016 according to the present embodiment each have a shape elongated in the widthwise direction of the vehicle (the lateral direction). The vehicle position detecting device 1010 performs the first erosion process after performing the first dilation process on the rear lamp images IMGa0 to IMGa3 with the center pixels of the respective first structuring elements 1016 each mapped to a pixel 1016a of interest. FIG. 10A, FIG. 10C, and FIG. 10E schematically illustrate the first structuring elements 1016, and the number of pixels forming the respective portions that extend rightward and leftward from the center pixel of each first structuring element 1016 is not limited to what is depicted in the drawing.

In the first dilation process, if the pixels that overlap the first structuring element 1016 includes a pixel of a high pixel value, the pixel value of the pixel 1016a of interest is changed to this high pixel value. Meanwhile, in the first erosion process, if the pixels that overlap the first structuring element 1016 include a pixel of a low pixel value, the pixel value of the pixel 1016a of interest is changed to this low pixel value. Thus, a lateral dilated region 1018 where a pair of rear lamps RL included in the rear lamp image IMGa0, IMGa1, or IMGa3 and appearing side by side in the widthwise direction of the vehicle is connected to each other is generated.

The vehicle position detecting device 1010 performs the first dilation process and the first erosion process on a first image by use of a first structuring element 1016 that is relatively shorter in the widthwise direction of the vehicle and performs the first dilation process and the first erosion process on a second image by use of a first structuring element 1016 that is relatively longer in the widthwise direction of the vehicle. In other words, the first structuring element 1016 used on the first image is shorter in the widthwise direction of the vehicle than the first structuring element 1016 used on the second image, and the first structuring element 1016 used on the second image is longer in the widthwise direction of the vehicle than the first structuring element 1016 used on the first image. To rephrase, the vehicle position detecting device 1010 performs the first dilation process and the first erosion process by use of the first structuring element 1016 that is shorter in the widthwise direction of the vehicle on the image that has been subjected to the second erosion process a smaller number of times.

FIG. 10A shows a first structuring element 1016b used in the first dilation process and the first erosion process performed on the rear lamp image IMGa0. FIG. 10C shows a first structuring element 1016c used in the first dilation process and the first erosion process performed on the rear lamp image IMGa1. FIG. 10E shows a first structuring element 1016d used in the first dilation process and the first erosion process performed on the rear lamp image IMGa3.

Normally, the distance in a pair of rear lamps RL increases gradually as the vehicle becomes closer to the host vehicle. Therefore, the first dilation process in which the first structuring element 1016 that is shorter in the widthwise direction of the vehicle is used can connect a pair of rear lamps RL that is far from the vehicle but cannot connect a pair of rear lamps RL that is close to the host vehicle. Accordingly, performing the first dilation process by use of the first structuring elements 1016 of different lengths makes it possible to select a pair for which a lateral dilated region 1018 is generated in accordance with the distance from the host vehicle.

The first structuring element 1016b used on the rear lamp image IMGa0, or a first image, is shorter in the right-left direction than the first structuring element 1016c used on the rear lamp image IMGa1, or a second image. The rear lamp image IMGa0 is an image that has been subjected to the second dilation process zero times and includes not only the pairs RL1 and RL3 of rear lamps RL close to the host vehicle but also the pair RL2 of rear lamps RL far from the host vehicle. Accordingly, performing the first dilation process on the rear lamp image IMGa0 by use of the first structuring element 1016b yields a lateral dilated region 1018 where the rear lamps RL in each pair RL2 are connected to each other, but keeps the rear lamps RL in each of the pairs RL1 and RL3 separated from each other, as illustrated in FIG. 10B.

Meanwhile, the first structuring element 1016c used on the rear lamp image IMGa1, or a second image, is longer in the right-left direction than the first structuring element 1016b. Therefore, performing the first dilation process on the rear lamp image IMGa1 by use of the first structuring element 1016c yields a lateral dilated region 1018 where the rear lamps RL in the pair RL1 close to the host vehicle are connected to each other, as illustrated in FIG. 10D. Here, the rear lamps RL in the pair RL3 that is closer to the host vehicle than the rear lamps RL in the pair RL1 remain separated from each other.

The first structuring element 1016c used on the rear lamp image IMGa1, or a first image, is shorter in the right-left direction than the first structuring element 1016d used on the rear lamp image IMGa3, or a second image. Accordingly, performing the first dilation process on the rear lamp image IMGa1 by use of the first structuring element 1016c yields a lateral dilated region 1018 where the rear lamps RL in the pair RL1 are connected to each other, but keeps the rear lamps RL in the pair RL3 separated from each other, as illustrated in FIG. 10D.

Figure 10F:
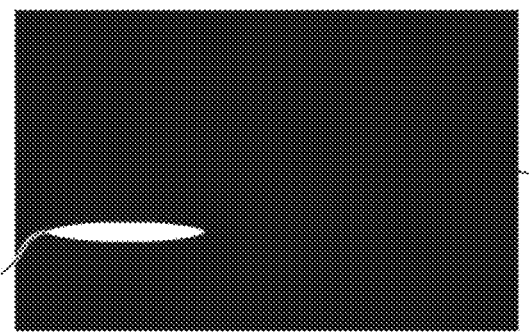

Meanwhile, the first structuring element 1016d used on the rear lamp image IMGa3, or a second image, is longer in the right-left direction than the first structuring element 1016c. Therefore, performing the first dilation process on the rear lamp image IMGa3 by use of the first structuring element 1016d yields a lateral dilated region 1018 where the rear lamps RL in the pair RL3 close to the host vehicle are connected to each other, as illustrated in FIG. 10F.

The length of each first structuring element 1016 can be set as appropriate in accordance with the distance in the pair of luminous points from which a lateral dilated region 1018 is generated. Moreover, the correspondence relationship between the number of times the second erosion process is performed and the length of the first structuring element 1016 can be set as appropriate. For example, the length of each first structuring element 1016 used on the corresponding one of the rear lamp images IMGa0 to IMGa3 is set in accordance with the least spaced part pair of luminous points among pairs of luminous points that remain after the second erosion process has been performed each number of times.

The rear lamp image IMGa1 does not include the pair RL2 of rear lamps RL as the rear lamp image IMGa1 has been subjected to the second erosion process. This can prevent a lateral dilated region 1018 derived from the pair RL2 of rear lamps RL from being generated through the first dilation process where the first structuring element 1016c is used. In a similar manner, the rear lamp image IMGa3 does not include the pairs RL1 and RL2 of rear lamps RL as the rear lamp image IMGa3 has been subjected to the second erosion process. This can prevent a lateral dilated region 1018 derived from the pair RL1 or RL2 of rear lamps RL from being generated through the first dilation process where the first structuring element 1016d is used.

When the first dilation process is performed on the pair RL2 of rear lamps RL by use of the first structuring element 1016c or the first structuring element 1016d that are each relatively longer, the lateral dilated region 1018 obtained through this first dilation process may be longer in the widthwise direction of the vehicle than a lateral dilated region 1018 obtained by use of the first structuring element 1016b that is relatively shorter.

For example, if the process of extracting each lamp described above is not performed, that is, if the first dilation process is performed on the image IMG illustrated in FIG. 7A that includes the headlamps HL and the rear lamps RL, using the first structuring element 1016c or the first structuring element 1016d that are each relatively longer may yield a single lateral dilated region 1018 generated from the pair RL2 of rear lamps RL and the pair HL2 of headlamps HL that appear side by side in the right-left direction.

Alternatively, when, for example, the host vehicle is traveling on a road with multiple lanes in each direction, all the luminous points in the image IMG illustrated in FIG. 7A can be rear lamps RL. In this case, even if the process of extracting the rear lamps RL described above has been performed, that is, even if the first dilation process has been performed on the rear lamp image IMGa, using the first structuring element 1016c or the first structuring element 1016d that is relative longer may yield a single lateral dilated region 1018 generated from two pairs RL2 of rear lamps RL appearing side by side in the right-left direction.

In these cases, even though two vehicles are actually traveling side by side ahead of the host vehicle, the vehicle position detection that is based on the lateral dilated region 1018 may determine that there is only one vehicle. In this respect, when the first structuring elements 1016 of different lengths are used in accordance with the distance in each pair of luminous points, the lateral dilated region 1018 corresponding to each front vehicle can be generated more reliably. This configuration makes it possible to detect the position of a vehicle with higher accuracy.

The vehicle position detecting device 1010 executes a similar process on the headlamp image IMGb as well. In other words, the vehicle position detecting device 1010 performs the first dilation process and the first erosion process on the headlamp images IMGb0 to IMGb5 by use of respective first structuring elements 1016 of a predetermined shape elongated in the widthwise direction of the vehicle schematically illustrated in FIG. 11A, FIG. 11C, and FIG. 11E (S1107). The vehicle position detecting device 1010 performs the first erosion process after performing the first dilation process on the headlamp images IMGb0 to IMGb5 with the center pixels of the respective first structuring elements 1016 each mapped to a pixel 1016a of interest. The first dilation process and the first erosion process yield each lateral dilated region 1018 where the pair of headlamps HL included in the headlamp image IMGb and appearing side by side in the widthwise direction of the vehicle are connected to each other.

The vehicle position detecting device 1010 performs the first dilation process and the first erosion process on a first image by use of a first structuring element 1016 that is relatively shorter in the widthwise direction of the vehicle and performs the first dilation process and the first erosion process on a second image by use of a first structuring element 1016 that is relatively longer in the widthwise direction of the vehicle. In other words, the first structuring element 1016 used on the first image is shorter in the widthwise direction of the vehicle than the first structuring element 1016 used on the second image, and the first structuring element 1016 used on the second image is longer in the widthwise direction of the vehicle than the first structuring element 1016 used on the first image.

Figure 11A:
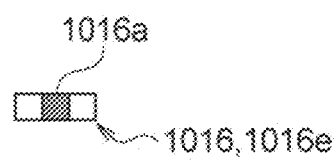
FIG. 11A to FIG. 11F each illustrate a structuring element used or an image generated in the control executed by a light distribution controlling device.
Figure 11B:
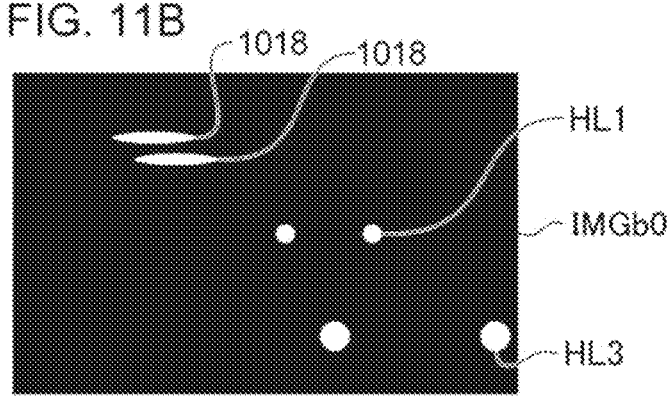
Figure 11C:
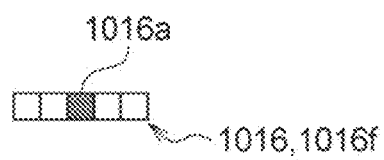
Figure 11D:
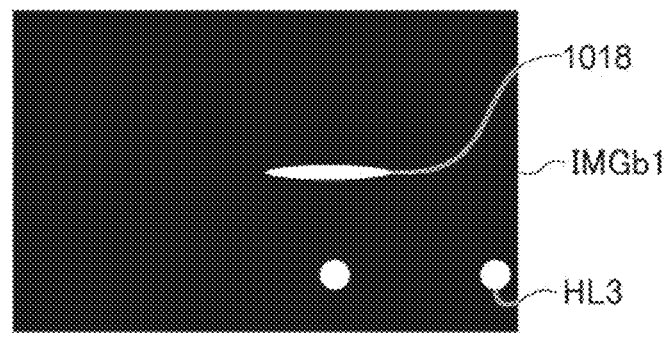
Figure 11E:
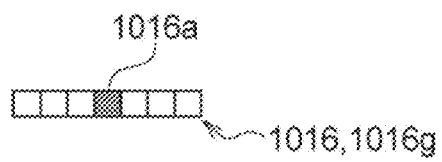

FIG. 11A shows a first structuring element 1016e used in the first dilation process and the first erosion process performed on the headlamp image IMGb0. FIG. 11C shows a first structuring element 1016f used in the first dilation process and the first erosion process performed on the headlamp image IMGb1. FIG. 11E shows a first structuring element 1016g used in the first dilation process and the first erosion process performed on the headlamp image IMGb5.

The first structuring element 1016e used on the headlamp image IMGb0, or a first image, is shorter in the right-left direction than the first structuring element 1016f used on the headlamp image IMGb1, or a second image. Accordingly, performing the first dilation process on the headlamp image IMGb0 by use of the first structuring element 1016e yields a lateral dilated region 1018 where the headlamps HL in the pair HL2 are connected to each other, but keeps the headlamps HL in each of the pairs HL1 and HL3 separated from each other, as illustrated in FIG. 11B.

Meanwhile, the first structuring element 1016f used on the headlamp image IMGb1, or a second image, is longer in the right-left direction than the first structuring element 1016e. Therefore, performing the first dilation process on the headlamp image IMGb1 by use of the first structuring element 1016f yields a lateral dilated region 1018 where the headlamps HL in the pair HL1 close to the host vehicle are connected to each other, as illustrated in FIG. 11D. The headlamps HL in the pair HL3 that are closer to the host vehicle than the headlamps HL in the pair HL1 remain separated from each other.

The first structuring element 1016f used on the headlamp image IMGb1, or a first image, is shorter in the right-left direction than the first structuring element 1016g used on the headlamp image IMGb5, or a second image. Accordingly, performing the first dilation process on the headlamp image IMGb1 by use of the first structuring element 1016f yields a lateral dilated region 1018 where the headlamps HL in the pair HL1 are connected to each other, but keeps the headlamps HL in the pair HL3 separated from each other, as illustrated in FIG. 11D.

Figure 11F:
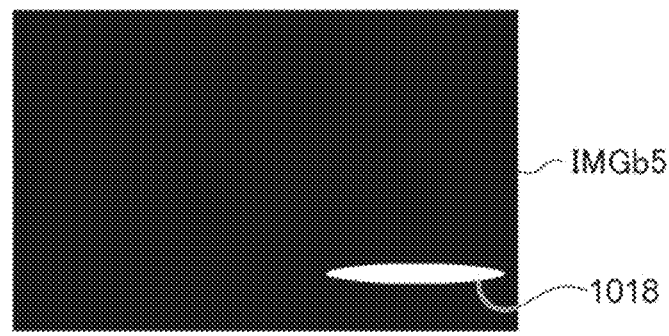

Meanwhile, the first structuring element 1016g used on the headlamp image IMGb5, or a second image, is longer in the right-left direction than the first structuring element 1016f. Therefore, performing the first dilation process on the headlamp image IMGb5 by use of the first structuring element 1016g yields a lateral dilated region 1018 where the headlamps HL in the pair HL3 close to the host vehicle are connected to each other, as illustrated in FIG. 11F.

The headlamp image IMGb1 does not include the pair HL2 of headlamps HL as the headlamp image IMGb1 has been subjected to the second erosion process. This can prevent the lateral dilated region 1018 derived from the pair HL2 of headlamps HL from being generated through the first dilation process where the first structuring element 1016f is used. In a similar manner, the headlamp image IMGb5 does not include the pairs HL1 and HL2 of headlamps HL as the headlamp image IMGb5 has been subjected to the second erosion process. This can prevent the lateral dilated region 1018 derived from the pair HL1 or HL2 of headlamps HL from being generated through the first dilation process where the first structuring element 1016g is used. This configuration makes it possible to detect the position of a vehicle with higher accuracy.

The order of the first dilation process and first erosion process performed on the rear lamp image IMGa (step S1106) and the first dilation process and first erosion process performed on the headlamp image IMGb (step S1107) is flexible, and these processes can be performed in parallel.

The vehicle position detecting device 1010 generates a rear lamp lateral dilated image including the lateral dilated regions 1018 that are based on the respective pairs of rear lamps RL by combining the rear lamp images IMGa0 to IMGa3, that is, by performing an OR operation on the rear lamp images IMGa (S1108). In addition, the vehicle position detecting device 1010 generates a headlamp lateral dilated image including the lateral dilated regions 1018 that are based on the respective pairs of headlamps HL by combining the headlamp images IMGb0 to IMGb5, that is, by performing an OR operation on the headlamp images IMGb (S1109). Herein, the order of the process of combining the rear lamp images IMGa (step S1108) and the process of combining the headlamp images IMGb (step S1109) is flexible, and these processes can be performed in parallel.

Figure 12A:
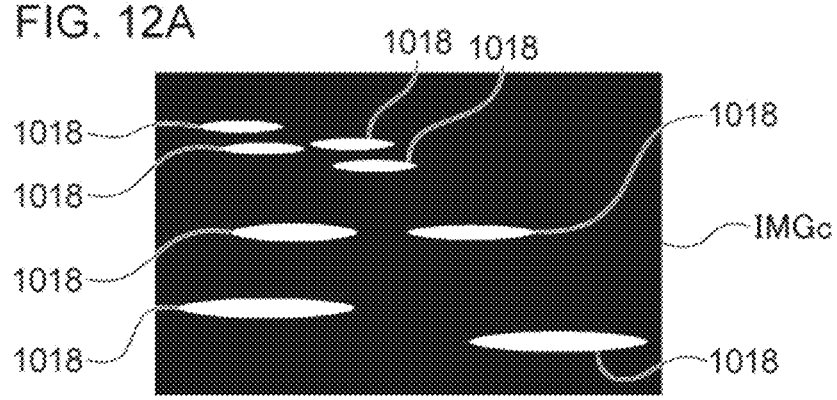
FIG. 12A to FIG. 12D each illustrate a structuring element used or an image generated in the control executed by a light distribution controlling device.

Then, the vehicle position detecting device 1010 generates a collective lateral dilated image IMGc illustrated in FIG. 12A by combining the rear lamp lateral dilated image and the headlamp lateral dilated image, that is, by performing an OR operation on these two images (S1110). The vehicle position detecting device 1010 can detect the position of each front vehicle based on the lateral dilated regions 1018 included in the collective lateral dilated image IMGc. For example, the vehicle position detecting device 1010 detects the position of each lateral dilated region 1018 itself in the collective lateral dilated image IMGc as the position of each front vehicle in the region ahead of the host vehicle.

The vehicle position detecting device 1010 transmits the collective lateral dilated image IMGc to the pattern determiner 1012 as information indicating the detection result. Herein, the vehicle position detecting device 1010 may extract, for example, angle information indicating the position of each front vehicle from the collective lateral dilated image IMGc and transmit the extracted result to the pattern determiner 1012. Moreover, the vehicle position detecting device 1010 may transmit the information indicating the detection result to, for example but not limited to, an ECU that controls automatic driving.

The pattern determiner 1012 determines a light distribution pattern PTN in which light is blocked at a portion corresponding to a front vehicle based on the result detected by the vehicle position detecting device 1010. "Light being blocked at a certain portion" includes a case where the brightness (the illuminance) of that portion is lowered as well as a case where the brightness (the illuminance) of that portion is brought absolutely to zero.

Figure 12B:
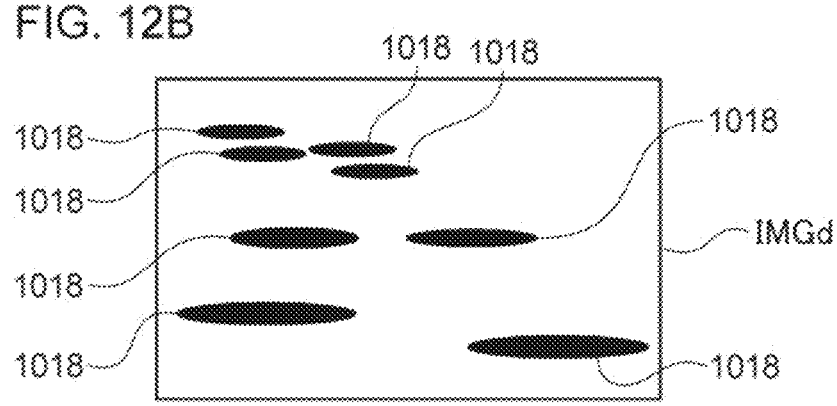

The pattern determiner 1012 according to the present embodiment generates an inverted image IMGd illustrated in FIG. 12B by inverting the image including the generated lateral dilated regions 1018, that is, by inverting the pixel value of each pixel in the collective lateral dilated image IMGc (S1111). In the inverted image IMGd, the lateral dilated regions 1018 have a low pixel value, and the region excluding the lateral dilated regions 1018 has a high pixel value.

Figure 12C:
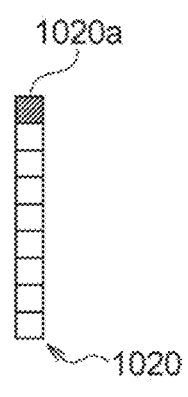

Then, the pattern determiner 1012 performs a third erosion process on the inverted image IMGd by use of a third structuring element 1020 of a predetermined shape illustrated in FIG. 12C (S1112). The third structuring element 1020 according to the present embodiment has a shape elongated in the up-down direction. The vehicle position detecting device 1010 performs the third erosion process on the inverted image IMGd with a pixel at the upper end of the third structuring element 1020 mapped to a pixel 1020a of interest. FIG. 12C schematically illustrates the third structuring element 1020, and the number of pixels forming the portion that extends downward from the pixel at the upper end of the third structuring element 1020 is not limited to what is depicted in the drawing.

Figure 12D:
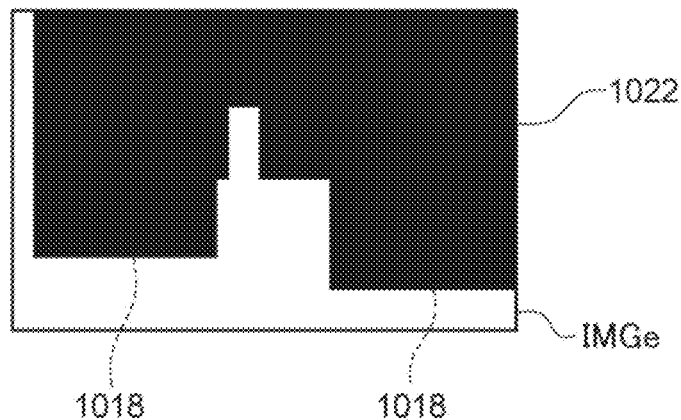

In the third erosion process, if the pixels that overlap the third structuring element 1020 include a pixel of a low pixel value, the pixel value of the pixel 1020a of interest is changed to this low pixel value. This causes the region with a high pixel value located on the upper side of the inverted lateral dilated regions 1018 to be eroded in the upward direction, and a light distribution pattern image IMGe illustrated in FIG. 12D is generated. The light distribution pattern image IMGe includes an upper eroded region 1022 that extends upward from the lateral dilated regions 1018.

The pattern determiner 1012 determines a light distribution pattern PTN that includes a light blocking portion based on the light distribution pattern image IMGe (S1113). In determining the light distribution pattern PTN, the pattern determiner 1012 incorporates the upper eroded region 1022 into the light blocking portion. For example, the pattern determiner 1012 sets the shape itself of the pixel group of a low pixel value in the light distribution pattern image IMGe as the light blocking portion and sets the shape itself of the pixel group of a high pixel value as the shape of the light distribution pattern PTN. Moreover, the pattern determiner 1012 sets a predetermined first illuminance to a region excluding the light blocking portion and sets a second illuminance lower than the first illuminance to the light blocking portion. As described above, the second illuminance may be zero or an illuminance that is higher than zero but lower than the first illuminance.

The pattern determiner 1012 transmits data indicating this light distribution pattern PTN to the lamp controlling device 1008. The lamp controlling device 1008 controls the light distribution variable lamp 1002 so that the light distribution variable lamp 1002 emits a visible light beam L1 having an intensity distribution corresponding to the light distribution pattern PTN set by the pattern determiner 1012. For example, in a case where the light distribution variable lamp 1002 includes a DMD, the lamp controlling device 1008 controls the on and off of the light source and the on/off switching of each mirror element forming the DMD. This control makes it possible to form the light distribution pattern PTN having the light blocking portion that overlaps the front vehicles and to increase the visibility of the driver of the host vehicle without causing glare to the driver of the front vehicles.

Herein, the pattern determiner 1012 may generate an inverted image IMGd and perform image processing involving the third structuring element 1020 in reverse order. In other words, the pattern determiner 1012 performs the third dilation process on the collective lateral dilated image IMGc by use of the third structuring element 1020 and then generates an upper dilated region that extends upward from the lateral dilated regions 1018. Thereafter, the pattern determiner 1012 generates an inverted image IMGd by inverting the pixel value of each pixel in the image in which the upper dilated region has been generated and incorporates the upper dilated region in this inverted image IMGd into the light blocking portion.

As described above, the vehicle position detecting device 1010 according to the present embodiment generates a lateral dilated region 1018 by performing the first dilation process and the first erosion process on the image that is based on the imaging device 1004 by use of the first structuring element 1016 of a predetermined shape elongated in the widthwise direction of the vehicle, and detects the position of a front vehicle based on the lateral dilated region 1018. The lateral dilated region 1018 is a region in which a pair of luminous points included in an image and appearing side by side in the widthwise direction of the vehicle is connected to each other, and the imaging device 1004 captures an image of a region ahead of the vehicle. This configuration can provide a novel detection method with which the position of a front vehicle can be detected in a simpler way as compared to a case where, for example, a front vehicle is detected by executing an image analysis, including algorithm recognition or deep learning, on an image IMG obtained from the imaging device 1004.

The vehicle position detecting device 1010 generates a first image that includes a pair of luminous points located at a predetermined first distance and a pair of luminous points located at a second distance farther than the first distance with the number of times the second erosion process is performed on an image that is based on the imaging device 1004 by use of the second structuring element 1014 of a predetermined shape set to a relatively low number, and generates a second image that includes the pair of luminous points located at the first distance and in which the pair of luminous points located at the second distance has been deleted with the number of times the second erosion process is performed on the image that is based on the imaging device 1004 set to a relatively high number. Then, the vehicle position detecting device 1010 performs the first dilation process and the first erosion process on the first image by use of the first structuring element 1016 that is relatively shorter in the widthwise direction of the vehicle and performs the first dilation process and the first erosion process on the second image by use of the first structuring element 1016 that is relatively longer in the widthwise direction of the vehicle. In other words, the vehicle position detecting device 1010 generates the first image by performing the second erosion process on the image a predetermined number of times and generates the second image by performing the second erosion process on the image a greater number of times than the number of times the second erosion process is performed to generate the first image. Then, the vehicle position detecting device 1010 performs the first dilation process and the first erosion process on the first image by use of the first structuring element 1016 of a predetermined length in the widthwise direction of the vehicle and performs the first dilation process and the first erosion process on the second image by use of the first structuring element 1016 that is longer in the widthwise direction of the vehicle than the first structuring element 1016 used on the first image.

In other words, the vehicle position detecting device 1010 distinguishes the luminous points of each front vehicle based on the distance by varying the number of times the second erosion process is performed and performs the first dilation process and the first erosion process by use of a first structuring element 1016 of a size that varies for each distinguished pair of luminous points. This configuration makes it possible to detect the position of a front vehicle with higher accuracy.

The vehicle lamp system 1001 according to the present embodiment includes the imaging device 1004, the light distribution variable lamp 1002, the light distribution controlling device 1006, and the lamp controlling device 1008. The imaging device 1004 captures an image of a region ahead of the vehicle. The light distribution variable lamp 1002 can illuminate the region ahead of the vehicle with a visible light beam L1 of a variable intensity distribution. The light distribution controlling device 1006 includes the vehicle position detecting device 1010 and the pattern determiner 1012 that determines a light distribution pattern PTN including a light blocking portion based on a detection result of the vehicle position detecting device 1010. The lamp controlling device 1008 controls the light distribution variable lamp 1002 so as to form the light distribution pattern PTN. This configuration can improve the visibility of the driver of the host vehicle while preventing glare caused to the driver of a front vehicle.

The pattern determiner 1012 generates an inverted image IMGd by inverting the pixel value of each pixel in an image in which a lateral dilated region 1018 has been generated, generates an upper eroded region 1022 that extends upward from the lateral dilated region 1018 by performing the third erosion process by use of the third structuring element 1020 of a predetermined shape elongated in the up-down direction, and incorporates the upper eroded region 1022 into the light blocking portion. This configuration can prevent glare caused to the driver of a front vehicle more reliably.

Thus far, Embodiment 2 according to the present invention has been described in detail. Embodiment 2 described above merely illustrates a specific example for implementing the present invention. The content of Embodiment 2 does not limit the technical scope of the present invention, and a number of design changes, including modification, addition, and deletion of a constituent element, can be made within the scope that does not depart from the sprit of the invention defined by the claims. A new embodiment resulting from adding a design change has advantageous effects of the embodiment combined as well as advantageous effects of the variation. With regard to Embodiment 2 described above, the expressions "according to the present embodiment," "in the present embodiment," and so on are added for emphasis to the content that can be subjected to such a design change as described above, but such a design change is also permitted on the content without these expressions. A desired combination of the constituent elements described above is also valid as an aspect of the present invention.

Hatching added along a section in the drawings does not limit the material of such with hatching.

The invention according to Embodiment 2 described above may be identified through the item indicated below.
(Item 4)
A vehicle position detecting method, comprising:
generating a lateral dilated region 1018 by performing a first dilation process and a first erosion process on an image that is based on an imaging device 1004 by use of a first structuring element 1016 of a predetermined shape elongated in a widthwise direction of a vehicle, the lateral dilated region 1018 being a region in which a pair of luminous points included in the image and appearing side by side in the widthwise direction of the vehicle are connected to each other, the imaging device 1004 capturing an image of a region ahead of the vehicle; and
detecting a position of a front vehicle based on the lateral dilated region 1018.

What is claimed is:
1. A light distribution controlling device, comprising:
a vehicle detector that detects a front vehicle through an image analysis on an image obtained from an imaging device that captures an image of a region ahead of a vehicle;
a region determiner that sets a processing region by adding a predetermined margin in a widthwise direction of the vehicle to a presence region of the front vehicle; and
a pattern determiner that, in parallel with the detection of the front vehicle by the vehicle detector, sets a light blocking portion based on a pixel value of a pair of luminous points included in the processing region and appearing side by side in the widthwise direction of the vehicle in the image obtained from the imaging device and determines a light distribution pattern that includes the light blocking portion, wherein
the pattern determiner
sets, in the image, a left luminous point pixel that overlaps a left luminous point in the pair of luminous points and a predetermined number of upper left pixels that are arrayed in an upward direction from the left luminous point pixel as an upper left dilating group, and sets, in the image, a right luminous point pixel that overlaps a right luminous point and a predetermined number of upper right pixels that are arrayed in the upward direction from the right luminous point pixel as an upper right dilating group,
sets the upper left dilating group and a predetermined number of right column pixels that are arrayed in a right direction from the upper left dilating group as a right dilating group,
sets the upper right dilating group and a predetermined number of left column pixels that are arrayed in a left direction from the upper right dilating group as a left dilating group, and
incorporates a pixel region where the right dilating group and the left dilating group overlap each other into the light blocking portion.

2. The light distribution controlling device according to claim 1, wherein
the pattern determiner
creates an upward dilated pattern image that includes the upper left dilating group and the upper right dilating group by changing a pixel value of the upper left pixels to a pixel value of the left luminous point pixel and changing a pixel value of the upper right pixels to a pixel value of the right luminous point pixel in the image and, creates a right dilated pattern image that includes the right dilating group by changing a pixel value of the right column pixels to a pixel value of the upper left dilating group in the upward dilated pattern image, creates a left dilated pattern image that includes the left dilating group by changing a pixel value of the left column pixels to a pixel value of the upper right dilating group in the upward dilated pattern image, and sets the light blocking portion by combining the right dilated pattern image and the left dilated pattern image.

3. The light distribution controlling device according to claim 1, wherein the region determiner repeatedly sets the processing region with respect to a same presence region and gradually increases a size of the margin as the number of times the processing region is set increases.

4. The light distribution controlling device according to claim 1, wherein the imaging device includes a high-speed camera and a low-speed camera having a frame rate lower than a frame rate of the high-speed camera, the vehicle detector detects the front vehicle based on an image obtained from the low-speed camera, and the pattern determiner determines the light distribution pattern based on an image obtained from the high-speed camera.

5. A vehicle lamp system, comprising:

an imaging device that captures an image of a region ahead of a vehicle;

a light distribution variable lamp that can illuminate the region ahead of the vehicle with a visible light beam of a variable intensity distribution;

the light distribution controlling device according to claim 1; and a lamp controlling device that controls the light distribution variable lamp so as to form the light distribution pattern.

6. A light distribution controlling method, comprising:

detecting a front vehicle through an image analysis on an image obtained from an imaging device that captures an image of a region ahead of a vehicle;

setting a processing region by adding a predetermined margin in a widthwise direction of the vehicle to a presence region of the front vehicle; and in parallel with the detecting of the front vehicle, setting a light blocking portion based on a pixel value of a pair of luminous points included in the processing region and appearing side by side in the widthwise direction of the vehicle in the image obtained from the imaging device and determining a light distribution pattern that includes the light blocking portion, wherein the determining of the light distribution pattern includes setting, in the image, a left luminous point pixel that overlaps a left luminous point in the pair of luminous points and a predetermined number of upper left pixels that are arrayed in an upward direction from the left luminous point pixel as an upper left dilating group, and setting, in the image, a right luminous point pixel that overlaps a right luminous point and a predetermined number of upper right pixels that are arrayed in the upward direction from the right luminous point pixel as an upper right dilating group, setting the upper left dilating group and a predetermined number of right column pixels that are arrayed in a right direction from the upper left dilating group as a right dilating group, setting the upper right dilating group and a predetermined number of left column pixels that are arrayed in a left direction from the upper right dilating group as a left dilating group, and incorporating a pixel region where the right dilating group and the left dilating group overlap each other into the light blocking portion.

7. The light distribution controlling method according to claim 6, wherein the determining of the light distribution pattern includes creating an upward dilated pattern image that includes the upper left dilating group and the upper right dilating group by changing a pixel value of the upper left pixels to a pixel value of the left luminous point pixel and changing a pixel value of the upper right pixels to a pixel value of the right luminous point pixel in the image, creating a right dilated pattern image that includes the right dilating group by changing a pixel value of the right column pixels to a pixel value of the upper left dilating group in the upward dilated pattern image, creating a left dilated pattern image that includes the left dilating group by changing a pixel value of the left column pixels to a pixel value of the upper right dilating group in the upward dilated pattern image, and setting the light blocking portion by combining the right dilated pattern image and the left dilated pattern image.

* * * * *